(12) United States Patent
Hertz et al.

(10) Patent No.: US 12,227,170 B1
(45) Date of Patent: Feb. 18, 2025

(54) PNEUMATICALLY SENSED VEHICLE INJURY AND DAMAGE MITIGATION SYSTEM

(71) Applicants: Allen D. Hertz, Boca Raton, FL (US); Andrew A. McClary, Boca Raton, FL (US)

(72) Inventors: Allen D. Hertz, Boca Raton, FL (US); Andrew A. McClary, Boca Raton, FL (US)

( * ) Notice: Subject to any disclaimer, the term of this patent is extended or adjusted under 35 U.S.C. 154(b) by 1103 days.

(21) Appl. No.: 16/929,063

(22) Filed: Jul. 14, 2020

Related U.S. Application Data

(60) Provisional application No. 62/875,218, filed on Jul. 17, 2019.

(51) Int. Cl.
| | |
|---|---|
| *B60W 30/09* | (2012.01) |
| *A61G 5/04* | (2013.01) |
| *A61G 5/10* | (2006.01) |
| *B62J 27/30* | (2020.01) |
| *B62J 45/20* | (2020.01) |
| *B62J 45/41* | (2020.01) |
| *B62K 5/007* | (2013.01) |

(52) U.S. Cl.
CPC ............... *B60W 30/09* (2013.01); *A61G 5/04* (2013.01); *A61G 5/10* (2013.01); *B62J 27/30* (2020.02); *B62J 45/20* (2020.02); *B62J 45/41* (2020.02); *B62K 5/007* (2013.01)

(58) Field of Classification Search
CPC ..... B60W 30/09; B60W 2300/38; A61G 5/04; A61G 5/10; B62J 27/30; B62J 45/20; B62J 45/41; B62K 5/007
See application file for complete search history.

(56) References Cited

U.S. PATENT DOCUMENTS

| | | | |
|---|---|---|---|
| 7,204,328 B2 | 4/2007 | LoPresti | |
| 9,834,164 B1* | 12/2017 | Iyer | .......................... B60R 21/38 |

(Continued)

FOREIGN PATENT DOCUMENTS

| | | |
|---|---|---|
| JP | 2006334082 A | 12/2006 |
| JP | 4431417 B2 | 3/2010 |

(Continued)

*Primary Examiner* — Abby J Flynn
*Assistant Examiner* — Daniel Tyler Reich
(74) *Attorney, Agent, or Firm* — Allen D. Hertz, P.A.; Allen D. Hertz

(57) ABSTRACT

An injury and damage mitigation system installed upon an electronic conveyance vehicle (ECV) (mobility scooter) that includes at least one pressure vessel. A sensor identifies an increase in pressure within the pressure vessel that occurs upon contact with a person/object. Once identified, the system reduces or interrupts power to the drive motor and/or applies a braking. The pressure vessel is integral with an impact element. Upon contact, the ECV decelerates to a stop. During deceleration, pressure vessel assembly compresses. The pressure vessel assembly is sized to compress to a dimension that is less than complete compression by the time the ECV stops. This ensures that minimal force is applied to the contacted person/object. The pressure vessel can be provided as a sealed vessel, an unsealed vessel, or a combination of a sealed and an unsealed vessel. The system can include an override feature and a reverse feature.

21 Claims, 21 Drawing Sheets

(56) References Cited

U.S. PATENT DOCUMENTS

| | | | |
|---|---|---|---|
| 2004/0220735 A1 | 11/2004 | Adams | |
| 2009/0008918 A1* | 1/2009 | Hall | B62D 21/14 |
| | | | 280/781 |
| 2010/0261406 A1* | 10/2010 | Hornsby | A63H 18/00 |
| | | | 446/457 |
| 2012/0169093 A1* | 7/2012 | Kume | G05D 1/0227 |
| | | | 297/118 |
| 2015/0041236 A1* | 2/2015 | Chen | B60R 19/02 |
| | | | 180/274 |
| 2016/0039378 A1* | 2/2016 | Foo | B60R 21/0136 |
| | | | 701/45 |
| 2016/0039379 A1* | 2/2016 | Saitoh | B60R 21/0136 |
| | | | 293/117 |
| 2019/0054876 A1* | 2/2019 | Ferguson | G06Q 50/40 |
| 2019/0054877 A1* | 2/2019 | Rastegar | B60R 19/023 |

FOREIGN PATENT DOCUMENTS

| | | |
|---|---|---|
| JP | 2010173416 A | 8/2010 |
| KR | 101749558 B1 | 6/2017 |
| NL | 1030008 C2 | 6/2006 |
| WO | WO2017217936 A1 | 12/2017 |

* cited by examiner

PNEUMATICALLY SENSED VEHICLE INJURY AND DAMAGE MITIGATION SYSTEM

CROSS-REFERENCE TO RELATED APPLICATION

This application is a Non-Provisional Patent Application claiming the benefit of U.S. Provisional Patent Application Ser. No. 62/875,218, filed on Jul. 17, 2019, which is incorporated herein in its entirety.

FIELD OF THE INVENTION

The present invention relates to an electronic conveyance vehicle (ECV) (mobility scooter). More specifically, the present invention relates to an assembly and a related system for installation onto an electronic conveyance vehicle (ECV) (mobility scooter) or integrated into the electronic conveyance vehicle (ECV) (mobility scooter) to cease directional movement of the electronic conveyance vehicle (ECV) (mobility scooter) upon contact with an object, a person, or other article.

BACKGROUND OF THE INVENTION

Electronic conveyance vehicles (ECV) (mobility scooters) provide transportation to handicapped persons and other persons having ambulatory or other physical limitations that would be impacted during walking. Electronic conveyance vehicles (ECV) (mobility scooters) are manufactured based upon a wide variety of designs. For example, some include four (4) wheels, where others include three (3) wheels. Some electronic conveyance vehicles (ECV) (mobility scooters) include a front and/or rear bumper, where the bumper is the outermost component, where the bumper would be the first element that makes contact with a person, an object, and the like. Some bumpers are fabricated of a rigid material, such as metal. Other bumpers are fabricated of a more pliant material, such as plastic or rubber. Other electronic conveyance vehicles (ECV) (mobility scooters) are designed where the tires are the farthest outermost component, where the tire would be the first element that makes contact with a person, an object, and the like.

Electronic conveyance vehicles (ECV) (mobility scooters) (including powered wheel chairs) are divided into a number of categories. Some are designed for use indoors only and are portable enough to fit in the trunk of a car. Others are for outdoor use only—these are generally larger and heavier. Some are designed for both indoor and outdoor use. The electronic conveyance vehicle (ECV) (mobility scooters)/powered wheel chairs can be categorized as follows:

Class 2 products which can only be used on the pavement (except where these is no pavement) and have a maximum speed of 4 mph. Service users aged under 14 are restricted to Class 2 products only.

Class 3 products which must be registered with the Driver Vehicle Licensing Authority (DVLA) (more advice is available from your local Motability dealer) (based upon laws in certain countries). These chairs can travel up to 8 mph on the road, although must only be driven at 4 mph on pavements. When driven on the road, they must obey all requirements and regulations as other road users.

Class 3 vehicles are not allowed on motorways, bicycle tracks or bus/cycle lanes, but are legally allowed on dual roadways.

The differences in weight and power (and thereby speed) of the two enable them to access different environments, but also have different legal requirements for the driver.

In more detail, a Class 2 product can be characterized as follows:
 are generally smaller, lighter and less powerful
 can be designed for indoor and/or outdoor use. If for indoor use, they will have limited outdoor use and less distance range
 some can be dismantled or folded for transporting
 cannot be used on the road (except where there is no pavement or to cross the road)
 outdoor models have the ability to climb curbs
 have a top speed of 4 mph (6.44 km/hour)
 do not need to be registered with the DVLA.

In more detail, a Class 3 product can be characterized as follows:
 are generally bigger, heavier and more powerful
 are not for indoor use
 can be used on the road
 have a longer distance range
 cannot be dismantled
 have a number of additional safety requirements to allow road use
 have a top speed of 4 mph (6.44 km/hour) off the road and 8 mph (12.9 km/hour) on the road must be registered with the DVLA
 the user must be aged at least 14 years.

Manual wheelchairs and Class 2 vehicles are those with an upper speed limit of 4 mph (6 km/h) and are designed to be used on pavement. Class 3 vehicles are those with an upper speed limit of 8 mph (12 km/h) and are equipped to be used on the road as well as the pavement. One exemplary electronic conveyance vehicle (ECV) (mobility scooter) is capable of reaching a speed of 18 miles per hour (MPH). The majority of the electronic conveyance vehicles (ECV) (mobility scooters) operate at a speed of 10 MPH or less.

Another example is a wheelchair that converts from a four wheel support configuration to a two wheel standing configuration.

Electronic conveyance vehicle (ECV) (mobility scooters) are used indoor locations in private residences, public structures, supermarkets, stores, malls, restaurants, theaters, arenas, and other indoor structures, as well as outdoor locations, such as parking lots, parks, theme parks, carnivals, stadiums, flea markets, amphitheaters, and other outdoor locations.

The wide range of locations for use of electronic conveyance vehicle (ECV) (mobility scooters), the size and weight of the electronic conveyance vehicle (ECV) (mobility scooters), and the speed of the electronic conveyance vehicle (ECV) (mobility scooters) can cause damage to properties and/or injuries other persons, such as pedestrians in the path of the electronic conveyance vehicle (ECV) (mobility scooter).

As mentioned above the designs of the electronic conveyance vehicle (ECV) (mobility scooters) vary. They all have one common trait: the front region when traveling forward and the rear region when traveling rearward can cause damage to properties and/or injuries other persons, such as pedestrians in the path of the electronic conveyance vehicle (ECV) (mobility scooter). Bumpers can impact a structure or a person. Metal bumpers are rigid and would cause damage to a structure or injury to a person. Plastic or softer bumpers are not sufficiently pliant to avoid or mitigate damage to a structure or injury to a person. The bumpers are generally provided to protect the electronic conveyance vehicle (ECV) (mobility scooter) and not the environment where the electronic conveyance vehicle (ECV) (mobility scooter) is operated.

What is desired is a system that can be installed onto or integrated into the original design, where the system avoids or mitigates damage to structures and/or injury to other persons who are not operating or riding in the scooter. The system should be easy to install, minimally impact the overall weight of the electronic conveyance vehicle (ECV) (mobility scooter), and minimally impact normal operation of the electronic conveyance vehicle (ECV) (mobility scooter).

SUMMARY OF THE INVENTION

The present invention overcomes the deficiencies of the known art and the problems that remain unsolved by providing a system and a method of use of the system that reduces or eliminates damage to structures when the electronic conveyance vehicle (ECV) (mobility scooter) contacts the structure and/or eliminates or significantly reduces injury to a person when the person is contacted by the electronic conveyance vehicle (ECV) (mobility scooter).

In accordance with one embodiment of the present invention, the invention consists of an impact resolution system for an electronic conveyance vehicle (ECV) (mobility scooter), the system comprising:

a pressure vessel that generates a change in pressure when an exterior surface of the pressure vessel is compressed;

a pressure sensor arranged to be affected by a change in pressure within the pressure vessel;

an operational controller in communication with the pressure sensor, where the operational controller one of directly or indirectly governs operation of the electronic conveyance vehicle (ECV) (mobility scooter).

In a second aspect, the operational controller can be configured to cease power from causing motion of the electronic conveyance vehicle (ECV) (mobility scooter).

In another aspect, the operational controller can be configured to cease power from causing at least one of a forward motion and a rearward motion of the electronic conveyance vehicle (ECV) (mobility scooter).

In yet another aspect, the operational controller can be configured to cease power from causing one of a forward motion or a rearward motion of the electronic conveyance vehicle (ECV) (mobility scooter).

In yet another aspect, the operational controller can be configured to cease power from causing a forward motion of the electronic conveyance vehicle (ECV) (mobility scooter).

In yet another aspect, the operational controller can be configured to cease power from causing a rearward motion of the electronic conveyance vehicle (ECV) (mobility scooter).

In yet another aspect, the pressure vessel is formed as at least a portion of a bumper of the electronic conveyance vehicle (ECV) (mobility scooter).

In another aspect, the pressure vessel is formed as the bumper of the electronic conveyance vehicle (ECV) (mobility scooter).

In yet another aspect, the pressure vessel is formed as at least a portion of a front bumper of the electronic conveyance vehicle (ECV) (mobility scooter).

In yet another aspect, the pressure vessel is formed as at least a portion of a front bumper of the electronic conveyance vehicle (ECV) (mobility scooter), wherein the front bumper includes at least a portion that is angled from the front end to contact objects on a side of the electronic conveyance vehicle (ECV) (mobility scooter).

In yet another aspect, the pressure vessel is formed as at least a portion of a rear bumper of the electronic conveyance vehicle (ECV) (mobility scooter).

In yet another aspect, the pressure vessel is formed as at least a portion of a rear bumper of the electronic conveyance vehicle (ECV) (mobility scooter), wherein the rear bumper includes at least a portion that is angled from the rear end to contact objects on a side of the electronic conveyance vehicle (ECV) (mobility scooter).

In yet another aspect, the pressure vessel is formed as the front bumper of the electronic conveyance vehicle (ECV) (mobility scooter).

In yet another aspect, the pressure vessel is formed as the rear bumper of the electronic conveyance vehicle (ECV) (mobility scooter).

In yet another aspect, the pressure vessel is a sealed pressure container.

In yet another aspect, the pressure vessel is an unsealed pressure container. This could be described as being analogous to a pet toy, where air can transfer from an interior to an atmosphere and return to the interior of the tubular or hollow structure.

In yet another aspect, the pressure vessel is an unsealed pressure container, wherein the unsealed pressure container includes a pressure release valve.

In yet another aspect, the pressure vessel is an unsealed pressure container, wherein the unsealed pressure container includes a pressure release valve and a refill valve.

In yet another aspect, the pressure vessel is an unsealed pressure container, wherein the unsealed pressure container includes a bidirectional flow control valve.

In yet another aspect, the pressure vessel can be a single holler structure having a single hollow interior volume.

In yet another aspect, the pressure vessel can be a holler structure having two or more segmented hollow interior volumes.

In yet another aspect, the pressure vessel can be a holler structure having two or more segmented hollow interior volumes, where at least one segmented hollow interior volume is located centrally respective to a shape of the bumper.

In yet another aspect, the pressure vessel can be a holler structure having two or more segmented hollow interior volumes, where at least one segmented hollow interior volume is located proximate an outer, distal, or free end respective to a shape of the bumper.

In yet another aspect, the pressure vessel can be a holler structure having two or more segmented hollow interior volumes, where at least one segmented hollow interior volume is located centrally respective to a shape of the bumper and at least a second segmented hollow interior volume is located proximate an outer, distal, or free end respective to a shape of the bumper.

In yet another aspect, the pressure sensor can be adjustable.

In yet another aspect, the pressure sensor can be adjustable, where the adjustment is respective to a desired pressure subjected to the pressure sensor.

In yet another aspect, the pressure sensor can be adjustable, where the adjustment is respective to a desired pressure subjected to the pressure sensor, wherein the adjustment is provided by a biasing element.

In yet another aspect, the pressure sensor can be adjustable, where the adjustment is respective to a desired pressure subjected to the pressure sensor, wherein the adjustment is provided by a tensile biasing element.

In yet another aspect, the pressure sensor can be adjustable, where the adjustment is respective to a desired pressure subjected to the pressure sensor, wherein the adjustment is provided by a compression biasing element.

In yet another aspect, the pressure sensor can be adjustable, where the adjustment is respective to a desired pressure subjected to the pressure sensor, wherein the adjustment is provided by a coil spring.

In yet another aspect, the pressure sensor can be adjustable, wherein the adjustment provided by repositioning at least one element of the pressure sensor.

In yet another aspect, the pressure sensor can be adjustable, wherein the adjustment provided by repositioning at least one element of the pressure sensor, such as by repositioning a mating element of a switch.

In yet another aspect, the pressure sensor can be adjustable, wherein the adjustment provided by replacing at least one element of the pressure sensor with a similar element having different characteristics.

In yet another aspect, the pressure sensor can be adjustable, wherein the adjustment provided by removing at least one element of the pressure sensor.

In yet another aspect, the pressure sensor can be adjustable, wherein the adjustment provided by inserting at least one element of the pressure sensor.

In yet another aspect, the pressure sensor can be adjustable, wherein the adjustment provided by replacing at least one element of the pressure sensor with a similar element having different characteristics, such as by replacing an element having a pressure port with a different element having a pressure port of a different size.

In yet another aspect, the pressure sensor can be a digital pressure sensor.

In yet another aspect, the pressure sensor can be an analog pressure sensor.

In yet another aspect, the pressure sensor can be an analog pressure sensor, wherein one example of a suitable analog pressure sensor is manufactured by NXP semiconductors, model number MPXV7002.

In yet another aspect, one pressure sensor can be arranged to monitor a pressure change within one pressure vessel.

In yet another aspect, one pressure sensor can be arranged to monitor a pressure change within each respective pressure vessel of a plurality of pressure vessels.

In yet another aspect, one pressure sensor can be arranged to monitor a pressure change within one segment of the pressure vessel.

In yet another aspect, one or more pressure sensors can be arranged to monitor a pressure change within one segment of the pressure vessel.

In yet another aspect, one pressure sensor can be arranged to monitor a pressure change within two or more segments of the pressure vessel.

In yet another aspect, one pressure sensor can be arranged to monitor a pressure change within two or more pressure vessels.

In yet another aspect, the operational controller can be integrated into the pressure sensor.

In yet another aspect, the operational controller can be integrated into the pressure sensor, wherein the operational controller is an electrical switch/relay.

In yet another aspect, the operational controller can be integrated into the pressure sensor, wherein the operational controller is an electrical switch that toggles between an open configuration and a closed configuration based upon a state of the pressure sensor.

In yet another aspect, the operational controller can be an electrical switch/relay that is separate from the pressure sensor.

In yet another aspect, the operational controller can be an electrical circuit.

In yet another aspect, the operational controller can be a digital electrical circuit.

In yet another aspect, the operational controller can be an analog electrical circuit.

In yet another aspect, the operational controller can be integrated into the pressure sensor, wherein the operational controller is an electrical circuit.

In yet another aspect, the operational controller can be a switch operated using at least one magnetically charged element.

In yet another aspect, the operational controller can be a switch operated by movement of the at least one magnetically charged element.

In yet another aspect, the system can further comprise at least one first sensor located in a first tubular element and at least one second sensor located in a second tubular element, where the first tubular element is located at a first end of the electronic conveyance vehicle (ECV) (mobility scooter) and the second tubular element is located at a second end of the electronic conveyance vehicle (ECV) (mobility scooter).

In yet another aspect, the system can further comprise at least one first sensor located in a first tubular element and at least one second sensor located in a second tubular element, where the first tubular element is located at a first end of the electronic conveyance vehicle (ECV) (mobility scooter) and the second tubular element is located at a second end of the electronic conveyance vehicle (ECV) (mobility scooter), wherein the first end and the second end are opposite to one another.

In yet another aspect, the system can further comprise at least one first sensor located in a first tubular element and at least one second sensor located in a second tubular element, where the first tubular element is located at a front or leading end of the electronic conveyance vehicle (ECV) (mobility scooter) and the second tubular element is located at a rear or trailing end of the electronic conveyance vehicle (ECV) (mobility scooter).

In yet another aspect, the system can further comprise an override feature, wherein the override feature would override a cease in power caused by a compression to the pressure vessel.

In yet another aspect, the system can further comprise an reverse feature, wherein the reverse feature would override a cease in power caused by a compression to the pressure vessel, while allowing motion of the electronic conveyance vehicle (ECV) (mobility scooter) only in a direction that is opposite of the direction of travel when the pressure vessel contacted became compressed.

In yet another aspect, the system can further comprise an reverse feature, wherein the reverse feature would override a cease in power caused by a compression to the pressure vessel, while allowing motion of the electronic conveyance vehicle (ECV) (mobility scooter) only in a direction that is opposite of the direction of travel when the pressure vessel contacted became compressed until the pressure vessel is no longer subject to compression.

In yet another aspect, the system can further comprise a sensor control unit.

In yet another aspect, at least one of the override feature and the reverse feature can be located on a steering wheel (sometimes referred to as a handle bar).

In yet another aspect, the system can further comprise a sensor control unit, wherein the sensor control unit can include a circuit comprising an intelligence component, such as a microprocessor.

In yet another aspect, the system can further comprise a sensor control unit, wherein the sensor control unit can include a circuit comprising an intelligence component, such as a microprocessor and an instruction set.

In yet another aspect, the operational controller opens an electrical circuit provided between a battery and each at least one motor.

In yet another aspect, a braking system is activated when a pressure increase is identified within the interior of the pressure vessel.

In yet another aspect, the operational controller activates a braking system.

In yet another aspect, the operational controller is configured to activate the braking system.

In yet another aspect, the operational controller is configured to directly or indirectly activate the braking system.

In yet another aspect, the system can further comprise a pressure module to operate the braking system.

In yet another aspect, the system can further comprise a mount for securing the pressure vessel to the electronic conveyance vehicle (ECV) (mobility scooter).

In yet another aspect, the system can further comprise a mount for securing the pressure vessel to the electronic conveyance vehicle (ECV) (mobility scooter), wherein the mount includes at least one element that is slideably assembled to a second element.

In yet another aspect, the system can further comprise a mount for securing the pressure vessel to the electronic conveyance vehicle (ECV) (mobility scooter), wherein the mount includes at least one sliding element that is slideably assembled to a second sliding element, wherein movement of the at least one sliding element respective to the second sliding element is managed by a biasing element.

In yet another aspect, the system can further comprise a mount for securing the pressure vessel to the electronic conveyance vehicle (ECV) (mobility scooter), wherein the mount includes at least one sliding element that is slideably assembled to a second sliding element, wherein movement of the at least one sliding element respective to the second sliding element is managed by a coil spring.

In yet another aspect, the system can further comprise a mount for securing the pressure vessel to the electronic conveyance vehicle (ECV) (mobility scooter), wherein the mount includes at least one sliding element that is slideably assembled to a second sliding element, wherein movement of the at least one sliding element respective to the second sliding element is governed by a dampening element.

In yet another aspect, a dimension of the pressure vessel in a direction of travel is greater than a maximum potential distance of travel of the electronic conveyance vehicle (ECV) (mobility scooter) from a maximum speed to a complete stand-still.

In yet another aspect, a pliant insert can be located in an interior of the pressure vessel.

In yet another aspect, the pliant element can be fabricated of foam.

In yet another aspect, a pliant impact absorbing unit can be located externally from the pressure vessel.

In yet another aspect, the pliant impact absorbing unit can be located externally between the electronic conveyance vehicle (ECV) (mobility scooter) and the pressure vessel.

In yet another aspect, the pliant impact absorbing unit can be located externally between a mount extending outward from the electronic conveyance vehicle (ECV) (mobility scooter) and the pressure vessel.

Introducing a method of operation of an electronic conveyance vehicle (ECV) (mobility scooter) comprising a pressure vessel extending outward from at least one end of the electronic conveyance vehicle (ECV) (mobility scooter), the method of use includes the steps of:
- increasing a pressure within the pressure vessel from contact with an object when traveling in a direction of travel;
- sensing a pressure increase within the pressure vessel; and
- causing the electronic conveyance vehicle (ECV) (mobility scooter) to reduce speed in the direction of travel as a result of the sensed increase in pressure within the pressure vessel.

In a second aspect, the method further comprises a step of:
- contacting a pressure vessel located at a forward or front end of the electronic conveyance vehicle (ECV) (mobility scooter).

In another aspect, the method further comprises a step of:
- contacting a pressure vessel located at a rearward or trailing end of the electronic conveyance vehicle (ECV) (mobility scooter).

In yet another aspect, wherein the step of causing the electronic conveyance vehicle (ECV) (mobility scooter) to reduce speed in the direction of travel as a result of the sensed increase in pressure within the pressure vessel is accomplished by reducing power provided to a drive motor of the electronic conveyance vehicle (ECV) (mobility scooter).

In yet another aspect, wherein the step of causing the electronic conveyance vehicle (ECV) (mobility scooter) to reduce speed in the direction of travel as a result of the sensed increase in pressure within the pressure vessel is accomplished by eliminating power provided to a drive motor of the electronic conveyance vehicle (ECV) (mobility scooter).

In yet another aspect, wherein the step of causing the electronic conveyance vehicle (ECV) (mobility scooter) to reduce speed in the direction of travel as a result of the sensed increase in pressure within the pressure vessel is accomplished by applying a braking to the electronic conveyance vehicle (ECV) (mobility scooter).

In yet another aspect, wherein the step of causing the electronic conveyance vehicle (ECV) (mobility scooter) to reduce speed in the direction of travel as a result of the sensed increase in pressure within the pressure vessel is accomplished by at least one of (a) reducing power provided to a drive motor of the electronic conveyance vehicle (ECV) (mobility scooter) and (b) applying a braking to the electronic conveyance vehicle (ECV) (mobility scooter).

In yet another aspect, wherein the step of causing the electronic conveyance vehicle (ECV) (mobility scooter) to reduce speed in the direction of travel as a result of the sensed increase in pressure within the pressure vessel is accomplished by at least one of (a) eliminating power provided to a drive motor of the electronic conveyance vehicle (ECV) (mobility scooter) and (b) applying a braking to the electronic conveyance vehicle (ECV) (mobility scooter).

Introducing another method of operation of an electronic conveyance vehicle (ECV) (mobility scooter) comprising a pressure vessel extending outward from at least one end of the electronic conveyance vehicle (ECV) (mobility scooter), the method of use includes the steps of:

identifying when the pressure vessel contacts an object when traveling in a direction of travel;

causing the electronic conveyance vehicle (ECV) (mobility scooter) to reduce speed in the direction of travel as a result of the identifying contact with the pressure vessel; and reducing a dimension of the pressure vessel in the direction of travel, wherein the electronic conveyance vehicle (ECV) (mobility scooter) stops traveling in the direction of travel before the dimension of the pressure vessel in the direction of travel is completely minimized.

In yet another aspect, the method further comprises steps of:

increasing a pressure within the pressure vessel from the contact with an object when traveling in a direction of travel; and identifying the contact by sensing a pressure increase within the pressure vessel.

In yet another aspect, the method further comprises a step of:

utilizing a sensor control module, wherein the sensor control module is programmed to activate a safety action (slow/stop the mobility cart) when an increase in pressure within the pressure vessel is identified.

In yet another aspect, the method further comprises a step of:

utilizing a sensor control module, wherein the sensor control module can include circuitry to activate a safety action (slow/stop the mobility cart) when an increase in pressure within the pressure vessel is identified.

In yet another aspect, the method further comprises steps of:

utilizing a sensor control module, wherein the sensor control module is programmed to activate a safety action (slow/stop the mobility cart) when an increase in pressure within the pressure vessel is identified; and maintaining the safety action until the sensor control module determines that the contact is no longer a potential threat of damage and/or injury.

In yet another aspect, the method further comprises steps of:

activating the safety action (slow/stop the mobility cart) when an increase in pressure within the pressure vessel is identified; and reducing a motion in a direction of travel to a stand-still prior to a complete compression of the pressure vessel in the direction of travel.

In yet another aspect, the complete compression of the pressure vessel in the direction of travel is defined as a condition where one interior surface section of the pressure vessel contacts a second interior surface section of the pressure vessel located opposite the one interior surface.

In yet another aspect, in an exemplary pressure vessel having a circular cross sectional shape, the first interior surface section could be a first quadrant and the second interior surface section can be a second quadrant, wherein the first quadrant and the second quadrant are located radially opposite one another.

In yet another aspect, in an exemplary pressure vessel having an elliptical cross sectional shape, the first interior surface section could be a first quadrant and the second interior surface section can be a second quadrant, wherein the first quadrant and the second quadrant are located radially opposite one another.

In yet another aspect, in another exemplary pressure vessel having a rectangular cross sectional shape, the first interior surface section could be a first wall and the second interior surface section can be a second wall, wherein the first wall and the second wall are located facing one another.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
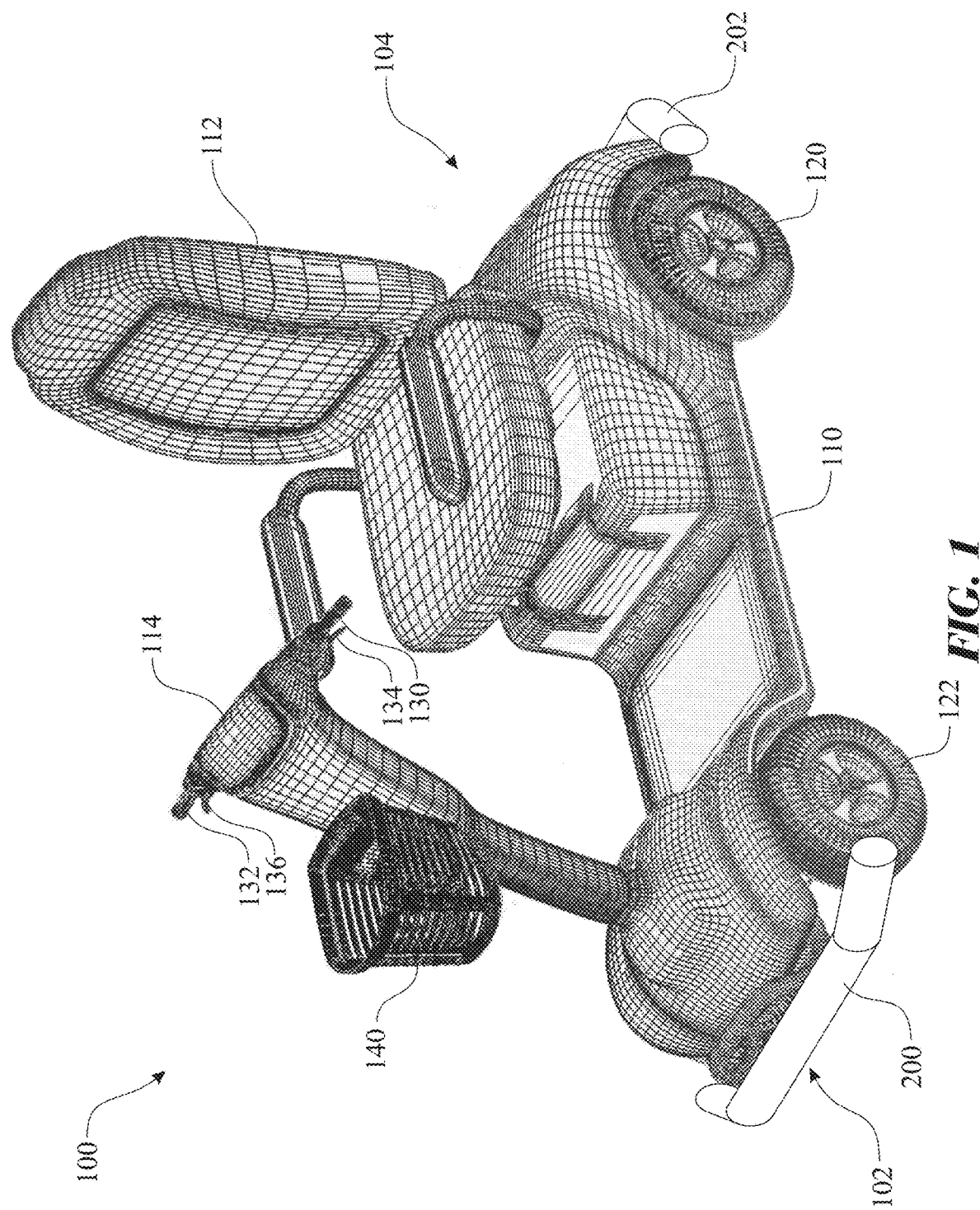
FIG. 1 presents an isometric view of an exemplary electronic conveyance vehicle (ECV) (mobility scooter) comprising a first tubular element installed as a front bumper and a second tubular element installed as a rear bumper in accordance with the present invention.
Figure 2:
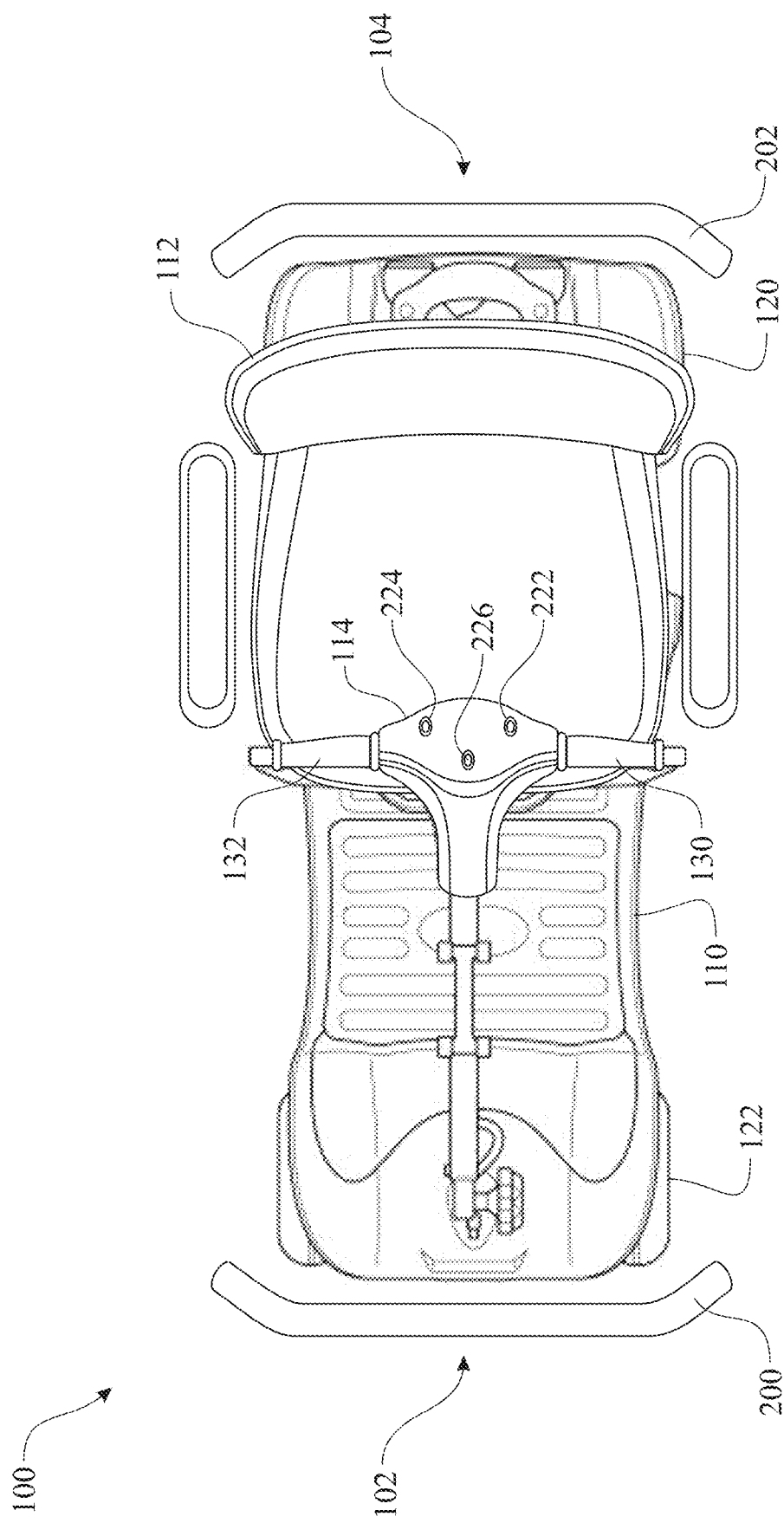
FIG. 2 presents a top view of the exemplary electronic conveyance vehicle (ECV) (mobility scooter) originally introduced in FIG. 1.
Figure 3:
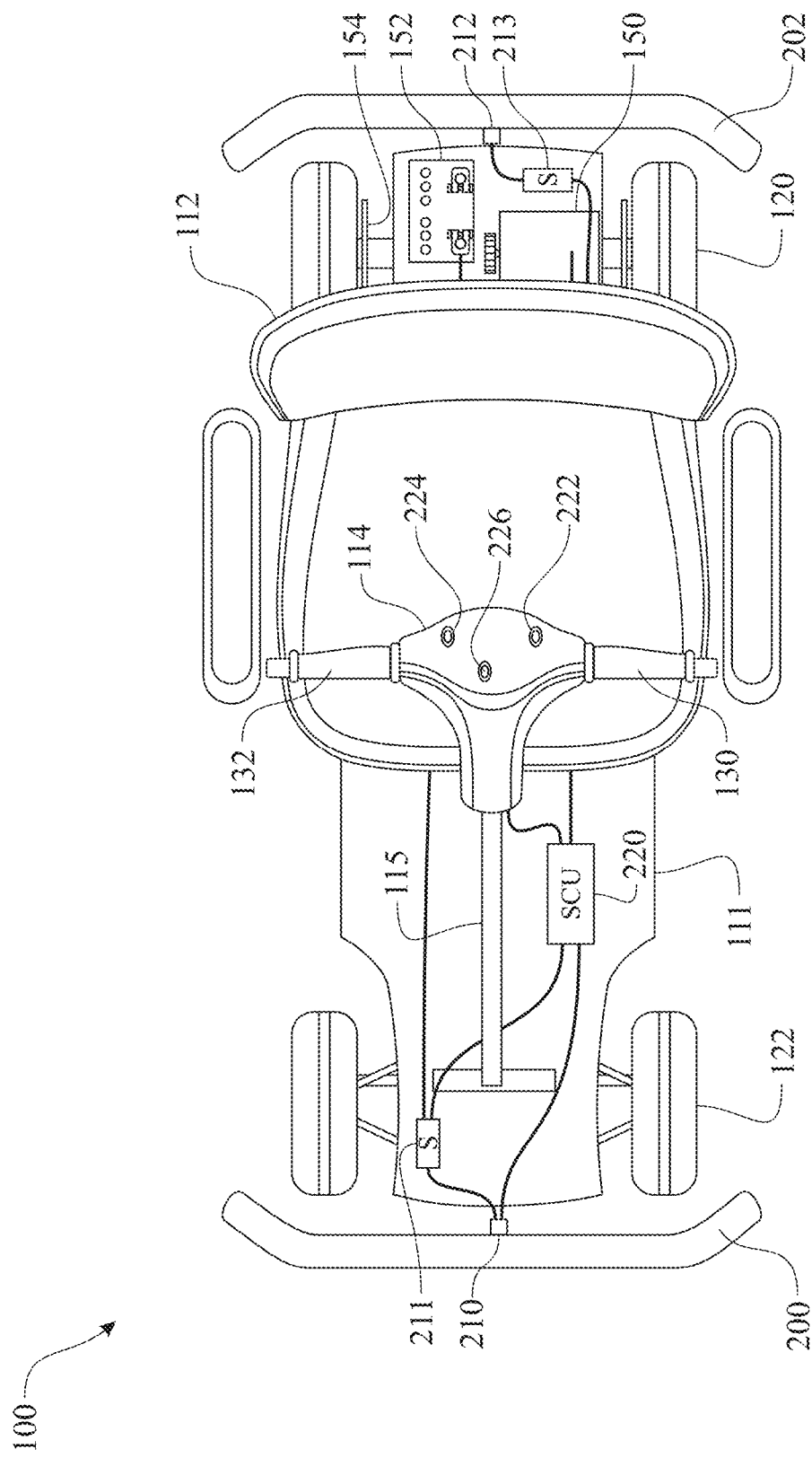
FIG. 3 presents a top view of the exemplary electronic conveyance vehicle (ECV) (mobility scooter) originally introduced in FIG. 1, wherein a body of the electronic conveyance vehicle (ECV) (mobility scooter) is removed.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A electronic conveyance vehicle (ECV) (mobility scooter) 100 having an exemplary injury and damage mitigation system installed is illustrated in FIGS. 1 through 4, with details of the exemplary injury and damage mitigation system being illustrated in FIGS. 5 through 11.

The illustrated electronic conveyance vehicle (ECV) (mobility scooter) 100 is exemplary of any powered disability assistance device, including a wheel chair, an electronic conveyance vehicle (ECV) (mobility scooter), and the like. Orientation of the electronic conveyance vehicle (ECV) (mobility scooter) 100 can be referenced by an ECV front end 102 and an ECV rear end 104. The ECV front end 102 is located forward of a rider, based upon an orientation of the rider and the ECV rear end 104 is located rearward of a rider, based upon the orientation of the rider. The illustrated electronic conveyance vehicle (ECV) (mobility scooter) 100 includes four (4) wheels 120, 122. Other variants of the electronic conveyance vehicle (ECV) (mobility scooter) 100 can include three (3) wheels, commonly includes a pair of rear wheels 120 and a single front wheel 122. Each of the variants of the electronic conveyance vehicle (ECV) (mobility scooter) 100 commonly includes an ECV body 110 mounted upon an ECV frame 111. The ECV frame 111 provides the primary structure of the electronic conveyance vehicle (ECV) (mobility scooter) 100. The ECV body 110 provides a barrier between a rider and operating equipment of the electronic conveyance vehicle (ECV) (mobility scooter) 100, thus protecting the rider from injury and the operating equipment from exposure to weather, water, sun exposure, debris, and other elements that can affect the function and reliability of the operating equipment. Each of the variants of the electronic conveyance vehicle (ECV) (mobility scooter) 100 commonly includes an ECV seat 112. Controls for operating the electronic conveyance vehicle (ECV) (mobility scooter) 100 can be provided in any of a number of configurations. In the exemplary illustration, the controls are provided on an ECV steering handlebar 114. The ECV steering handlebar 114 can be supported by an ECV steering column 115. This can include an accelerator, a braking element, and directional control. These can be provided in a form of a left hand controller 130, a right hand controller 132, a left hand brake 134, and a right hand brake 136. The left hand controller 130 and the right hand controller 132 can be employed for acceleration. The left hand brake 134 and the right hand brake 136 can be employed to activate a braking system. The electronic conveyance vehicle (ECV) (mobility scooter) 100 can include a master switch, such as an operating key, a master power or Sudbury switch, a toggle switch, a power disconnect switch, and the like.

The operating equipment commonly includes an ECV power supply (battery) 152, which provides power to an ECV drive motor 150. A directional control circuit 250 can be integrated into a circuit to govern a direction of travel of the electronic conveyance vehicle (ECV) (mobility scooter) 100. The ECV drive motor 150 directly or indirectly drives a rotation of a drive axle, which drives a rotation of the rear wheels 120 and/or the front wheels 122. The ECV steering handlebar 114 rotates the ECV steering column 115, which directs an orientation of the front wheels 122 to steer the electronic conveyance vehicle (ECV) (mobility scooter) 100. The ECV steering column 115 would be connected to a steering box, a rack, or any other steering control member. The steering control member is connected to a pair of tie rods, which cause the front wheels 122 to rotate according to a rotation of the ECV steering handlebar 114. Details of the arrangement of the operating equipment can be obtained from any of the currently available variants of the electronic conveyance vehicles (ECV) (mobility scooters) 100.

The present invention provides an injury and damage mitigation system that overrides power to the ECV drive motor 150 and/or the braking system. The injury and damage mitigation system includes a sensor 210, 212 installed to identify an increase in pressure within a respective pressure vessel 200, 202. The exemplary embodiment includes a front pneumatic operating switch (pressure sensor) 210 monitoring for a pressure change within the front pressure vessel 200 and a rear pneumatic operating switch (pressure sensor) 212 monitoring for a pressure change within the rear pressure vessel 202. The pressure sensor can be in electric or signal communication with (connected directly or indirectly) a pressure vessel solenoid 211, 213 and/or a safety control unit (SCU) 220. The pressure vessel solenoid 211, 213 toggles an operational power circuit, using an operating power safety control switch 251, between an open state and a closed state. The operational power circuit provides power from the ECV power supply (battery) 152 to the ECV drive motor 150. The operating power safety control switch 251 is installed between the ECV drive motor 150 and the ECV power supply (battery) 152. The operating power safety control switch 251 enables power transfer from the ECV power supply (battery) 152 to the ECV drive motor 150 when the operating power safety control switch 251 is toggled into a closed state. The operating power safety control switch 251 interrupts power transfer from the ECV power supply (battery) 152 to the ECV drive motor 150 when the operating power safety control switch 251 is toggled into an open state. During normal operation, the power levels provided from the ECV power supply (battery) 152 to the ECV drive motor 150 is controlled by the hand controller 130, 132. In a condition where the pneumatic operating switch (pressure sensor) 210, 212 detects an increase in a pressure within the interior volume of the respective pressure vessel 200, 202, the system causes the pressure vessel solenoid 211, 213 to toggle from a normally closed state to an open state, thus interrupting power from the ECV power supply (battery) 152 to the ECV drive motor 150. By interrupting the power between the ECV power supply (battery) 152 to the ECV drive motor 150, the system operates independent of the direction of travel. In an alternative or parallel arrangement, the safety control unit (SCU) 220 can be integrated between the pneumatic operating switch (pressure sensor) 210, 212 and the power circuit. The safety control unit (SCU) 220 would receive a signal from the pneumatic operating switch (pressure sensor) 210, 212; interpret the received signal accordingly; and when determined to be appropriate, would actuate the pressure vessel solenoid 211, 213.

In an alternative or additive arrangement, the injury and damage mitigation system can operate the braking system. A brake assembly 154 can be integrated to affect one or more wheels 120, 122. The brake assembly 154 can be operated by a brake pump/motor 254. When the pneumatic operating switch (pressure sensor) 210, 212 detects a pressure increase in the respective pressure vessel 200, 202, the safety control unit (SCU) 220 would direct the pressure vessel solenoid 211, 213 to close a brake piston/pump/motor switch 255. The brake piston/pump/motor switch 255 provides power to operate the braking system, such as by activating a brake pump/motor 254. The brake pump/motor 254 would cause the brake assembly 154 to apply a braking force, slowing and stopping the rotation of each respective wheel 120, 122.

The brake pump/motor 254 can be any suitable braking generator, include a piston operated system, a pump operated system, a motor operated system, and the like.

An override switch 222 can be integrated into the injury and damage mitigation system. The override switch 222 would provide a signal to the safety control unit (SCU) 220 to request an override to the interrupted power. The safety control unit (SCU) 220 can use logic to determine if the override request is proper prior to re-engaging power. The decision to override the interrupt can be based upon any of a number of conditions. A first exemplary condition would be a continued increase in pressure within the pressure vessel 200, 202. A second exemplary condition would be a span of time following the identified increase in pressure within the pressure vessel 200, 202. It is understood that other conditions can be used to determine whether the override is acceptable.

A directional control switch 224 can be integrated into the injury and damage mitigation system. The directional control switch 224 would provide a signal to the safety control unit (SCU) 220 to request to override the interrupted power and reverse the direction of motion. A decision to operate the electronic conveyance vehicle (ECV) (mobility scooter) 100 in a reverse direction is generally simpler than an override, as the direction would be away from the original reason for causing an interrupt or stop in the direction of travel. The safety control unit (SCU) 220 can include a logic to check a pressure status in the pressure sensor 210, 212 located in the opposite pressure vessel 200, 202.

A system status indicator 226 can be integrated into the injury and damage mitigation system. The system status indicator 226 would provide an output to indicate a status of the injury and damage mitigation system. The system status indicator 226 can indicate when the injury and damage mitigation system becomes activated. The system status indicator 226 can indicate when the injury and damage mitigation system is monitoring the pressure within the interior volume of the pressure vessel 200, 202, while the pressure is within an acceptable range. The system status indicator 226 can be provided in a form of an illuminating device, such as an incandescent bulb, a light emitting diode (LED), a fluorescent bulb; an audible alert; a wireless signal to a predetermined recipient; and the like. The indicator can be intended for receipt by the rider, a technician, a service company, a rental company, and the like.

Although the above describes several arrangements for accomplishing the desired function of stopping an electronic conveyance vehicle (ECV) (mobility scooter) 100 from traveling in a direction of travel upon identification of an increase in pressure within the pressure vessel 200, 202, it is understood that any suitable arrangement can be employed. Although the disclosure references the electronic conveyance vehicle (ECV) (mobility scooter) 100, it is understood that an electronically operated, a pneumatically operated, combustion operated, or any other suitable operating system, or any combination thereof is understood to be represented by the element of the electronic conveyance vehicle (ECV) (mobility scooter) 100.

The pressure vessels 200, 202 are preferably arranged to extend outward from the general structure of the electronic conveyance vehicle (ECV) (mobility scooter) 100. In an optimal arrangement the pressure vessels 200, 202 would be arranged having the entire collapsing direction outside of the farthest rigid component of the electronic conveyance vehicle (ECV) (mobility scooter) 100, thus ensuring collapse of the pressure vessel 200, 202 prior to any other feature of the electronic conveyance vehicle (ECV) (mobility scooter) 100 contacting the person or object. As illustrated, it is clear that the pressure vessels 200, 202 are located completely beyond the structure of the electronic conveyance vehicle (ECV) (mobility scooter) 100. In certain arrangements, a Cargo basket 140 can be secured to the electronic conveyance vehicle (ECV) (mobility scooter) 100 where the Cargo basket 140 would extend some distance outside of the perimeter of the electronic conveyance vehicle (ECV) (mobility scooter) 100. This can be considered when designing the configuration of the injury and damage mitigation system, and more specifically, the size, shape and location of the pressure vessels 200, 202. The Cargo basket 140 can be located on a front of the electronic conveyance vehicle (ECV) (mobility scooter) 100 (as shown) or a rear of the electronic conveyance vehicle (ECV) (mobility scooter) 100. The size, shape, and mounting arrangement of the Cargo basket 140 all affect how far the Cargo basket 140 extends outside a perimeter of the primary structure of the electronic conveyance vehicle (ECV) (mobility scooter) 100.

The pressure sensor 210, 212 can be any suitable pressure sensor 210, 212. The pressure sensor 210, 212 can be an analog sensor. The pressure sensor 210, 212 can be a digital sensor. The pressure sensor can provide an electrical output to a controller, as described above, or be directly integrated into a circuit that controls the power. The pressure sensor 210, 212 can be provided as an integrated circuit.

Figure 5:
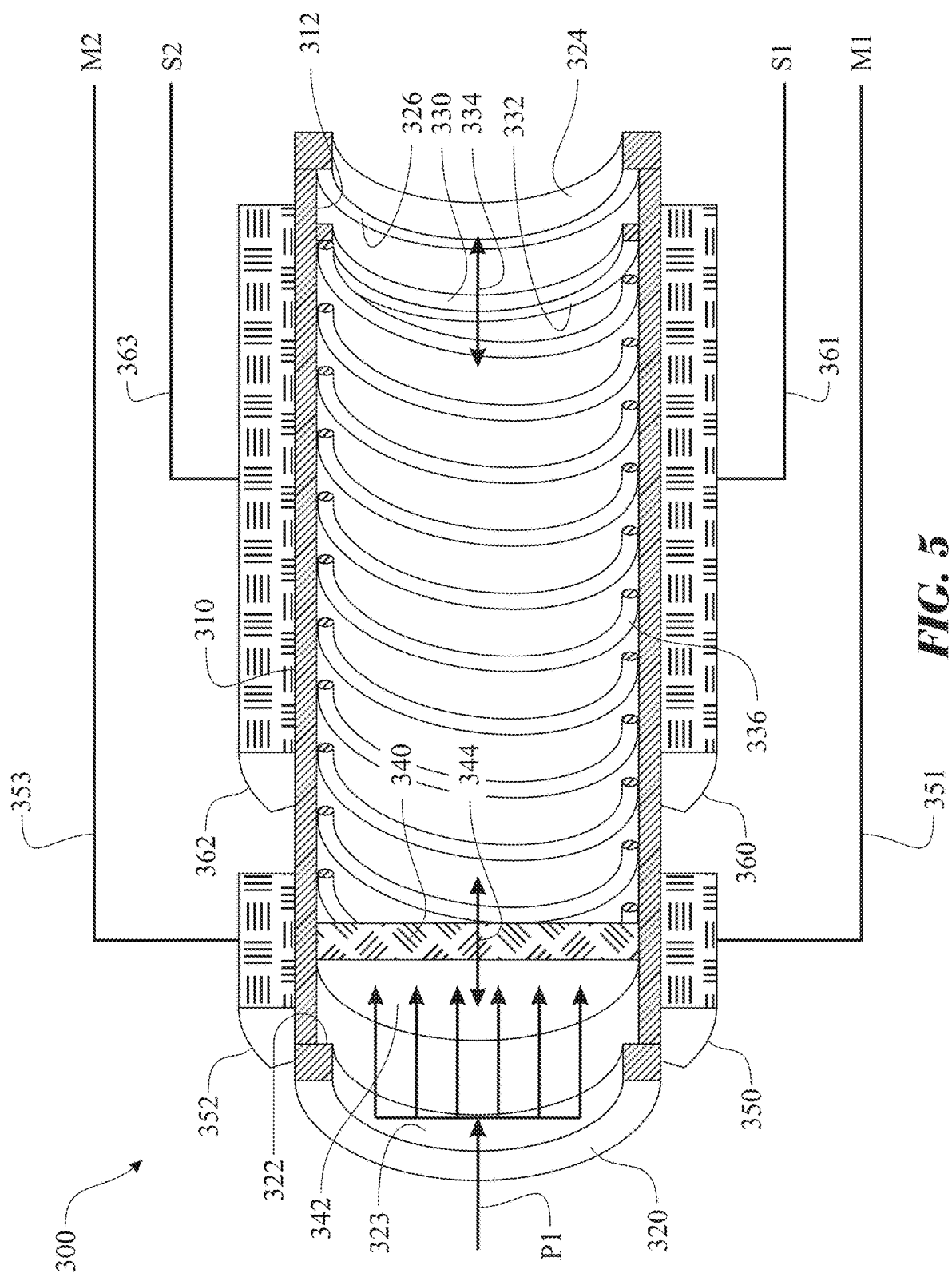
FIG. 5 presents a cross sectional view of an exemplary adjustable pressure sensor and switch combination, the illustration presented in a normal operating pressurize state.
Figure 6:
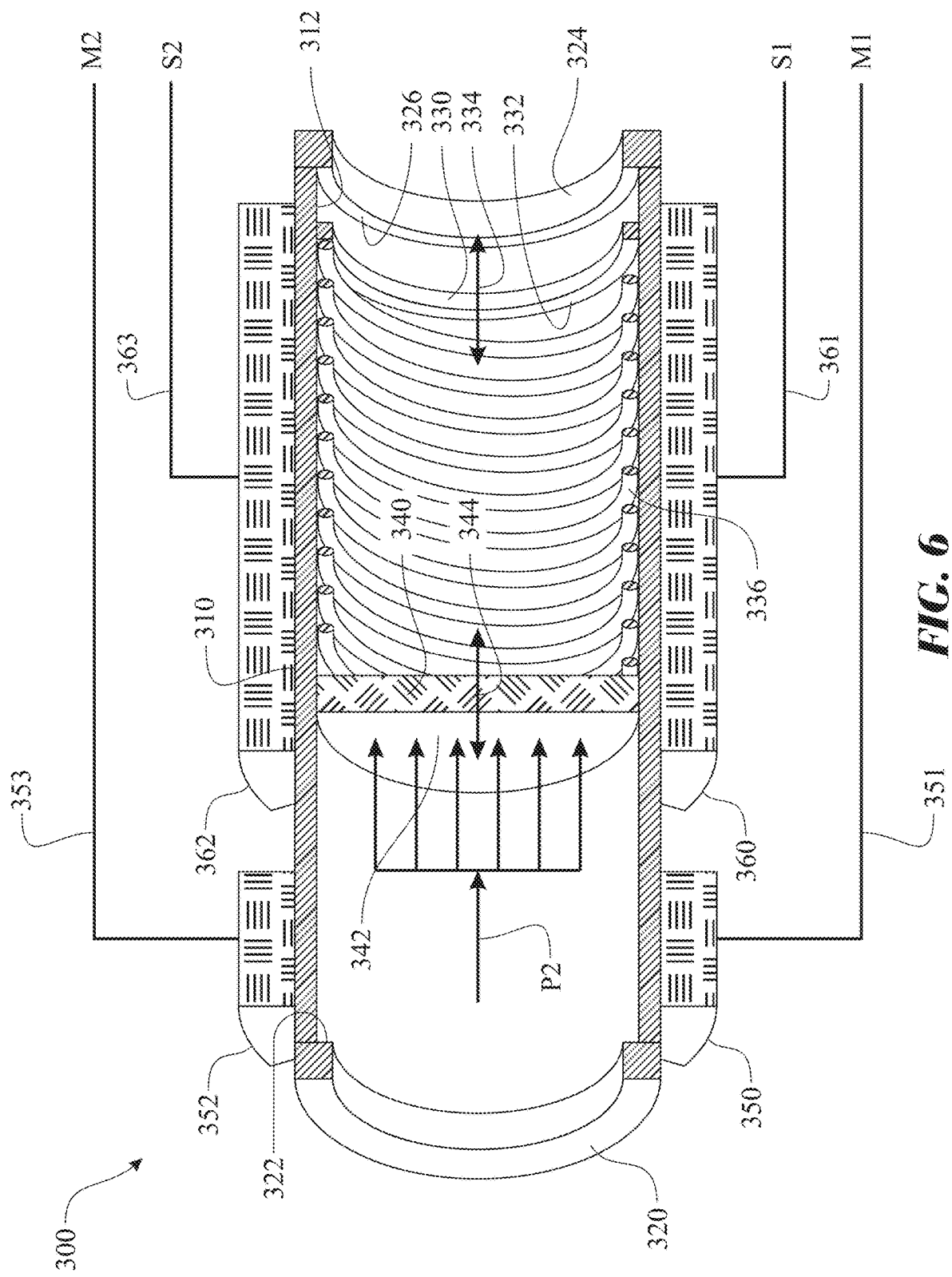
FIG. 6 presents a cross sectional view of the exemplary adjustable pressure sensor and switch combination originally introduced in FIG. 5, the illustration presented in an increased pressurized state.

One exemplary pneumatic operating switch (pressure sensor) 210, 212 is a pneumatically operated switch 300, detailed in FIGS. 5 and 6. The exemplary pneumatically operated switch 300 can operate as a switch. The exemplary pneumatically operated switch 300 includes a pneumatic switch biasing element 336 located internally of a pneumatic switch tubular body 310. A pneumatic switch pressure end ring 320 can be formed or secured to a first end of the pneumatic switch tubular body 310, wherein the first end is designed to be subjected to a monitored pressure. A pneumatic switch pressure end ring flange surface 322 of the pneumatic switch pressure end ring 320 faces an interior volume of the pneumatic switch tubular body 310. A pneumatic switch pressure end ring passageway 323 is formed through the pneumatic switch pressure end ring 320 providing a passageway for pressure to pass through the pneumatic switch pressure end ring 320 and enter the interior volume of the pneumatic switch tubular body 310 defined by the pneumatic switch tubular body interior surface 312. A pneumatic switch biasing end ring 324 can be formed or secured to a second end of the pneumatic switch tubular body 310. A pneumatic switch biasing end ring flange surface 326 of the pneumatic switch biasing end ring 324 faces the interior volume of the pneumatic switch tubular body 310. The pneumatic switch biasing end ring 324 preferably includes an aperture (as illustrated) enabling access to adjust a position of the pneumatic switch biasing force adjustment ring 330 along an axial length of the pneumatic switch tubular body interior surface 312, as indicated by a pneumatic switch biasing force adjustment ring adjustment motion 334.

The exemplary pneumatically operated switch 300 includes a pneumatic switch pressure disc 340 slideably assembled within pneumatic switch tubular body interior surface 312 of a pneumatic switch tubular body 310. A pneumatic switch biasing element 336 extends between a pneumatic switch biasing force adjustment ring contact surface 332 of the pneumatic switch biasing force adjustment ring 330 and a respective facing surface of the pneumatic switch pressure disc 340. The pneumatic switch biasing element 336 would be of a length to ensure the pneumatic switch pressure disc 340 remains seated against the pneumatic switch pressure end ring flange surface 322 of the pneumatic switch pressure end ring 320 when the pneumatic switch pressure disc 340 is not subjected to any pressure.

The exemplary pneumatically operated switch 300 employs magnetic properties to determine whether the pneumatic switch pressure disc 340 is subjected to an increased pressure. The pneumatic switch tubular body 310 would be fabricated of a non-magnetic material, such as plastic. The exemplary pneumatically operated switch 300 includes a pneumatic switch pressure disc 340 having magnetically charged properties or is fabricated of a magnetically attracted material. A pneumatic switch static pressure initial position first sensing element 350 and a pneumatic switch static pressure initial position second sensing element 352 are located on an exterior surface of the pneumatic switch tubular body 310 at a location proximate the pneumatic switch pressure end ring 320, where the pneumatic switch static pressure initial position first sensing element 350 and the pneumatic switch static pressure initial position second sensing element 352 are in radial alignment with one another. A pneumatic switch static pressure activation position first sensing element 360 and a pneumatic switch static pressure activation position second sensing element 362 would be similar to the pneumatic switch static pressure initial position first sensing element 350 and the pneumatic switch static pressure initial position second sensing element 352, except the pneumatic switch static pressure activation position first sensing element 360 and a pneumatic switch static pressure activation position second sensing element 362 would be located along the pneumatic switch tubular body 310 at a position further from the pneumatic switch pressure end ring 320 than the pneumatic switch static pressure initial position first sensing element 350 and the pneumatic switch static pressure initial position second sensing element 352. Additionally, the pneumatic switch static pressure activation position first sensing element 360 and the pneumatic switch static pressure activation position second sensing element 362 are preferably longer in an axial direction compared to the like dimension of the pneumatic switch static pressure initial position first sensing element 350 and the pneumatic switch static pressure initial position second sensing element 352. The pneumatic switch static pressure initial position first sensing element 350 and the pneumatic switch static pressure initial position second sensing element 352 are designed to identify a normal pressure within the interior volume of the pressure vessel 200, 202. This can include a pressure that is equal to an atmospheric or ambient pressure. In this condition, the pneumatic switch static pressure initial position first sensing element 350 and the pneumatic switch static pressure initial position second sensing element 352 would overlap or abut the pneumatic switch pressure end ring 320. It is also understood that the pressure within the interior volume of the pressure vessel 200, 202 can be less than the atmospheric or ambient pressure, causing the same condition.

An initial position first sensing element electrical conductor 351 provides electrical communication between the pneumatic switch static pressure initial position first sensing element 350 and a first monitored connection M1. An initial position second sensing element electrical conductor 353 provides electrical communication between the pneumatic switch static pressure initial position second sensing element 352 and a second monitored connection M2. An activation position first sensing element electrical conductor 361 provides electrical communication between the pneumatic switch static pressure activation position first sensing element 360 and a first sensed connection S1. An activation position second sensing element electrical conductor 363 provides electrical communication between the pneumatic switch static pressure activation position second sensing element 362 and a second sensed connection S2.

The selected pneumatic switch biasing element 336 preferably has a spring constant that enables the pneumatic switch pressure disc 340 to become positioned in registration with the pneumatic switch static pressure initial position first sensing element 350 and the pneumatic switch static pressure initial position second sensing element 352.

The exemplary pneumatically operated switch 300 includes several features. A first feature is a normal state indication capability. A normal state pressure P1 applies a force to a pneumatic switch pressure disc pressure receiving surface 342 of the pneumatic switch pressure disc 340, compressing the pneumatic switch biasing element 336, as illustrated in FIG. 5. The pneumatic switch pressure disc 340 is forced to a position located between the pneumatic switch static pressure initial position first sensing element 350 and the pneumatic switch static pressure initial position second sensing element 352. The movement of the pneumatic switch pressure disc 340 is referred to as a pneumatic switch pressure disc motion 344. The magnetic properties of the pneumatic switch pressure disc 340, the pneumatic switch static pressure initial position first sensing element 350 and the pneumatic switch static pressure initial position second sensing element 352 close an electrical circuit between first monitored connection M1 and second monitored connection M2. This indicates that a normal pressure exists within the pressure vessel 200, 202. In an alternative arrangement (lacking or of a minimal initial pressure), the pneumatic switch static pressure initial position first sensing element 350 and the pneumatic switch static pressure initial position second sensing element 352 can be located at a position along a length of the pneumatic switch tubular body 310 to create a closed circuit between the first monitored connection M1 and the second monitored connection M2 when the pneumatic switch pressure disc 340 is at rest against the pneumatic switch pressure end ring flange surface 322, resulting from the force generated by the pneumatic switch biasing element 336.

A second feature is an adjustable pressure indicator, where the pneumatically operated switch 300 can be adjusted to actuate at a predetermined applied pressure. The pneumatic switch pressure disc 340 is retained in a normal position by a pneumatic switch biasing element 336. One end of the pneumatic switch biasing element 336 is positioned against a pneumatic switch biasing force adjustment ring contact surface 332 of a pneumatic switch biasing force adjustment ring 330. The pneumatic switch biasing force adjustment ring 330 can be positionable along a length of the pneumatic switch tubular body interior surface 312. The pneumatic switch biasing force adjustment ring 330 can include a threading on an exterior surface, wherein the threading mates with a respective threading formed on the pneumatic switch tubular body interior surface 312. The position of the pneumatic switch biasing force adjustment ring 330 along the length of the pneumatic switch tubular body 310 can be adjusted by rotating the pneumatic switch biasing force adjustment ring 330 clockwise or counterclockwise. The pneumatic switch biasing force adjustment ring 330 can include one or more features to aid in rotating the pneumatic switch biasing force adjustment ring 330 within the pneumatic switch tubular body 310. The threading and pneumatic switch biasing element 336 would be designed to avoid interference between the threading and a compression/expansion of the pneumatic switch biasing element 336.

In a state where the pressure is increased P2, the increased pressure applies a greater force to the pneumatic switch pressure disc 340, further compressing the pneumatic switch biasing element 336, as illustrated in FIG. 6. The pneumatic switch pressure disc 340 is forced to a position located between the pneumatic switch static pressure activation position first sensing element 360 and the pneumatic switch static pressure activation position second sensing element 362. The magnetic properties of the pneumatic switch pressure disc 340, the pneumatic switch static pressure activation position first sensing element 360 and the pneumatic switch static pressure activation position second sensing element 362 closes an electrical circuit between system activation pressure P1 and stopped maximum compression pressure P2. This indicates that a pressure increased within the pressure vessel 200, 202. The pneumatic switch static pressure activation position first sensing element 360 and the pneumatic switch static pressure activation position second sensing element 362 can be of an extended length ensuring the pneumatic switch pressure disc 340 engages with the pneumatic switch static pressure activation position first sensing element 360 and the pneumatic switch static pressure activation position second sensing element 362 within a broad range of increased pressures.

Details of the pressure vessel 200, 202, in several variants, are illustrated in FIGS. 7 through 12. The pressure vessel 200, 202 can include any of a variety of features, several which are shown in the various exemplary variants of pressure vessels disclosed herein.

Figure 7:
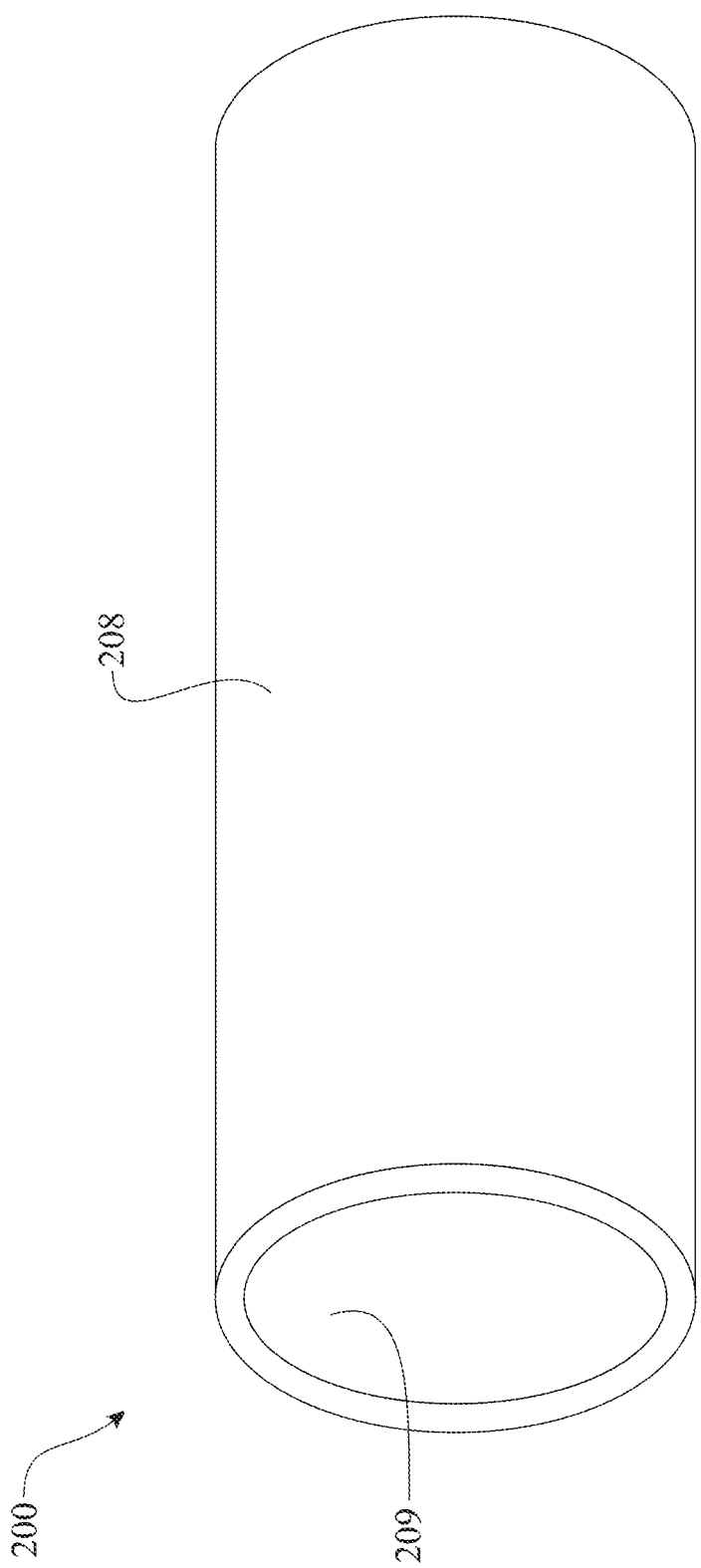
FIG. 7 presents an isometric side, front view of a section of the pressure vessel.

A basic pressure vessel is introduced in FIG. 7, which illustrates a section of an exemplary tubular pressure vessel 200. The exemplary pressure vessel 200 is formed having a pressure vessel shell 208 which defines a pressure vessel shell interior surface 209. The pressure vessel shell interior surface 209 defines an interior volume, where the interior volume can retain air or any other gas. The exemplary pressure vessel 200 can be a sealed pressure vessel or an unsealed pressure vessel. The pressure vessel shell 208 would be fabricated of a pliant material, such as rubber, nylon, flexible plastic, latex tubing, gum latex tubing, and the like. The pressure vessel can be sealed, retaining a predetermined volume of air or unsealed, where the pressure vessel includes a relief valve and a fill valve to control air flow, where the control of airflow ensures that contact with the exemplary pressure vessel 200 increases a pressure within the interior volume of the exemplary pressure vessel 200 in a manner that can be detected by the pneumatic operating switch (pressure sensor) 210, 212.

Figure 8:
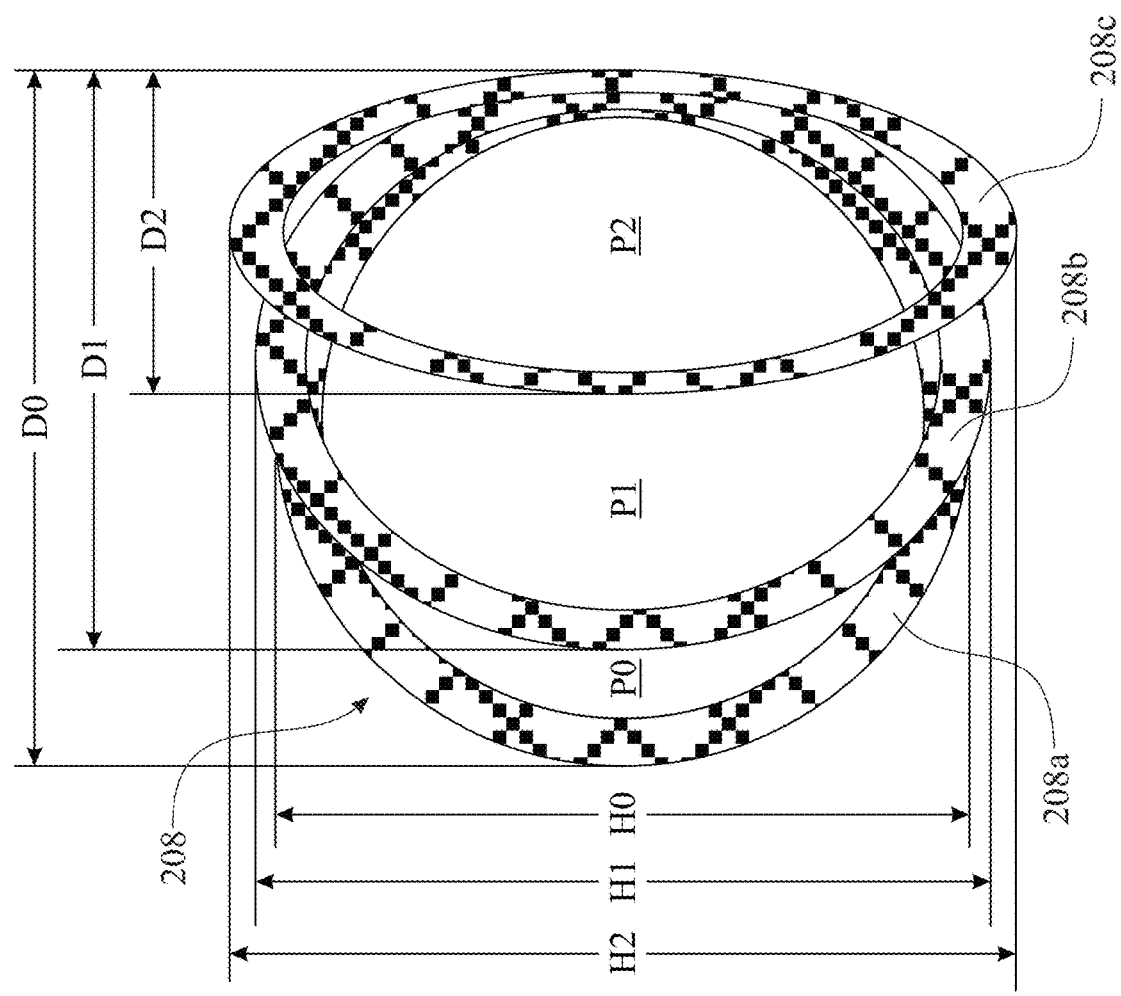
FIG. 8 presents a cross section view of the pressure vessel in various stages of compression.
Figure 9:
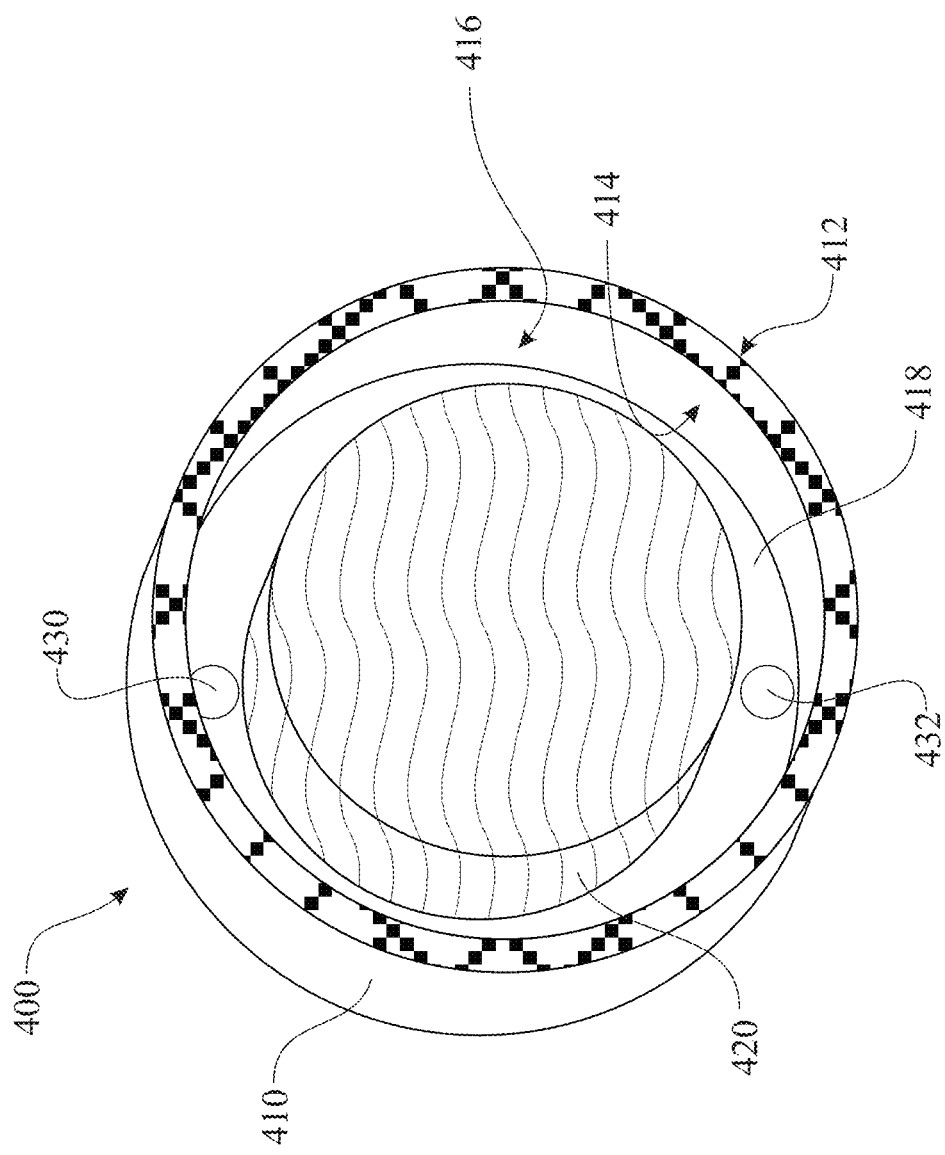
FIG. 9 presents a cross section view of a second exemplary pressure vessel comprising a pliant member disposed within an interior volume of the pressure vessel.

Compression of an exemplary pressure vessel 200 is illustrated in FIG. 8. In the exemplary illustration, P0 refers to a normal pressure and identifies the exemplary pressure vessel 200 where the pressure vessel shell 208 is shown in a normal operation state 208a. In this state, the normal operating pressure vessel shell 208a is formed having normal shape measured having a system activation pressure vessel height H1 and a normal operating pressure vessel diameter D0. When the exemplary pressure vessel 200 initially contacts an object, the pressure vessel shell 208 begins to compress in a direction of travel. The initial contact increases the pressure from the normal operating pressure P0 to a system activation pressure P1. In this state, the pressure vessel shell 208 is compressed in a direction of travel, changing the diameter in a direction of travel (as shown as a system activated pressure vessel shell 208b), decreasing the dimension from the normal operating pressure vessel diameter D0 to a system activation pressure vessel diameter D1 and a direction perpendicular to the direction of travel, increasing the dimension from the normal operating pressure vessel height H0 to a system activation pressure vessel height H1. The continuing contact increases the pressure from the system activation pressure P1 until the electronic conveyance vehicle (ECV) (mobility scooter) 100 stops moving where the pressure peaks at a stopped maximum compression pressure P2. In this state, the pressure vessel shell 208 is compressed in a direction of travel (as shown as a stopped maximum compression pressure vessel shell 208c), changing the diameter in a direction of travel, decreasing the dimension from the system activation pressure vessel diameter D1 to a stopped maximum compression pressure vessel diameter D2 and a direction perpendicular to the direction of travel, increasing the from the system activation pressure vessel height H1 to a stopped maximum compression pressure vessel height H2. It is noted that the pressure vessel shell 208, in the state where the electronic conveyance vehicle (ECV) (mobility scooter) 100 has stopped moving in a direction of travel, retains a gap between one interior surface section of the pressure vessel and a second interior surface section of the pressure vessel located opposite the one interior surface. In an alternative description, the direction parallel to the direction of travel can be referred to as a horizontal compressible direction. The term horizontal can refer to a direction of travel, whether the direction is horizontal from a level standpoint or angled upward or downward, but still parallel to a direction of travel of the electronic conveyance vehicle (ECV) (mobility scooter) 100.

The exemplary pressure vessel shell 208 has a circular cross sectional shape, wherein the first interior surface section could be a first quadrant and the second interior surface section could be a second quadrant, wherein the first quadrant and the second quadrant are located radially opposite one another. The pressure vessel shell 208 can be provided in any suitable shape. For example, the pressure vessel shell 208 can be provided having an elliptical cross sectioned shape, wherein the first interior surface section could be a first quadrant and the second interior surface section could be a second quadrant, wherein the first quadrant and the second quadrant are located radially opposite one another. In another example, the pressure vessel shell 208 can be provided having a rectangular cross sectioned shape, wherein the first interior surface section could be a first wall section and the second interior surface section could be a second wall section, wherein the first wall section and the second wall section are arranged having opposing surfaces.

The exemplary pressure vessel 200 can be provided having any of a variety of features. One exemplary variant of the exemplary pressure vessel 200, 202 is a compression element filled pressure vessel 400, illustrated in FIG. 9. The compression element filled pressure vessel 400 includes a compression element filled pressure vessel body 410 having a compression element filled pressure vessel body interior surface 412 and a compression element filled pressure vessel body exterior surface 414. The compression element filled pressure vessel body 410 can be an extrusion cut to a length, then having a compression element filled pressure vessel end wall 418 affixed to the cut end thereof. The compression element filled pressure vessel body exterior surface 414 defines an interior volume 416 within the compression element filled pressure vessel body 410. A compression element 420 can be disposed within the interior volume of the compression element filled pressure vessel body 410. The compression element 420 can be secured by each end, secured by a series of frame elements extending between the compression element filled pressure vessel body exterior surface 414 and the compression element 420 in a manner to avoid impacting a pressure change when the compression element filled pressure vessel body interior surface 412 contacts an object, or any other suitable assembly configuration. The compression element filled pressure vessel 400 includes a rear pneumatic operating switch (pressure sensor) 430 (similar to the pneumatic operating switch (pressure sensor) 210, 212). The exemplary compression element filled pressure vessel 400 also includes an optional pressure ventilation switch 432. The pressure ventilation switch 432 allows a controlled release of air from within the interior volume 416 of the compression element filled pressure vessel body 410 and return of air into the interior volume 416 of the compression element filled pressure vessel body 410. The pressure ventilation switch 432 can be designed to retain a predetermined pressure within the interior volume 416 of the compression element filled pressure vessel body 410 and upon reaching a predetermined pressure, release any air or gas causing the pressure to increase above the predetermined pressure within the interior volume 416 of the compression element filled pressure vessel body 410. The compression element filled pressure vessel body 410 can be of any suitable form factor that controls airflow at a rate to increase the air pressure within the interior volume 416 of the compression element filled pressure vessel body 410 when the compression element filled pressure vessel body interior surface 412 is contacted and compressed. The compression element 420 can be fabricated of a foam or any other suitable compliant material. The compression element 420 is provided to absorb the impact and reduce a volume of air within the compression element filled pressure vessel interior void 416 of the compression element filled pressure vessel body 410. The smaller the volume defined by the compression element filled pressure vessel interior void 416, the greater and more accurate the pressure change. The compression element filled pressure vessel 400 is one exemplary design that accommodates this characteristic.

Figure 10:
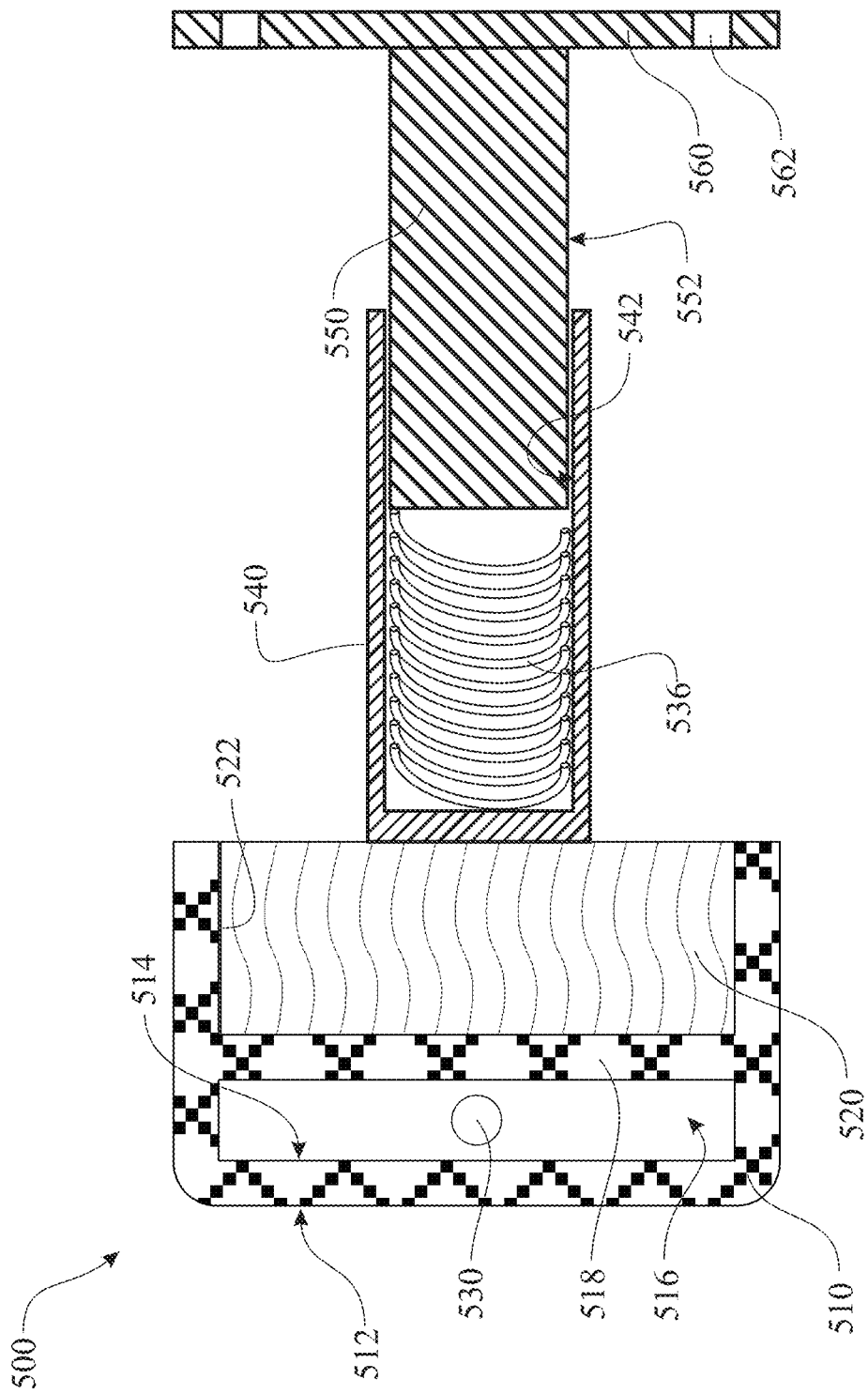
FIG. 10 presents a cross section view of a third exemplary pressure vessel comprising a pliant member disposed externally to the interior volume of the pressure vessel, the illustration further introducing a collapsible pressure vessel mounting structure.

A second exemplary variant of the pressure vessel arrangement is a compression element backed pressure vessel 500, illustrated in FIG. 10. The compression element backed pressure vessel 500 and the compression element filled pressure vessel 400 have a number of like elements. Like elements of the compression element backed pressure vessel 500 and the compression element filled pressure vessel 400 are numbered the same, except the elements of the compression element backed pressure vessel 500 are preceded by the numeral "5". The compression element backed pressure vessel 500 introduces a number of features that deviate from the pressure vessel 200, 202 and the compression element filled pressure vessel 400. In the compression element backed pressure vessel 500, a compression element 520 is located externally from the compression element backed pressure vessel interior void 516. The compression element backed pressure vessel interior void 516 is sealed. A rear pneumatic operating switch (pressure sensor) 530 is arranged to monitor for changes in pressure within the compression element backed pressure vessel interior void 516. The compression element backed pressure vessel interior void 516 is of a smaller size. The compression element backed pressure vessel body 510 is shaped to include a continuing structure that extends rearward of the compression element backed pressure vessel interior void 516, wherein the continuing structure that extends rearward has a compression element support surface 522. A compression element 520 is supported by the compression element support surface 522. The compression element 520 is fabricated of a compressible material that compresses at a force that would not cause injury to others and/or damage to structures when contacted by the compression element backed pressure vessel body exterior surface 512 of the compression element backed pressure vessel 500. In an alternative arrangement, the compression element 520 can be replaced with an air bladder that is a non-sealed pressure vessel, where the air bladder would compress at a force that would not cause injury to others and/or damage to structures when contacted by the compression element backed pressure vessel body exterior surface 512 of the compression element backed pressure vessel 500.

The compression element backed pressure vessel body 510 can be mounted onto the electronic conveyance vehicle (ECV) (mobility scooter) 100 using a mounting assembly. The mounting assembly can include a pressure vessel mount impact absorbing member 540 having a pressure vessel mount impact absorbing member sliding surface 542 and a pressure vessel mounting bracket 550 having a pressure vessel mounting bracket sliding surface 552. The pressure vessel mount impact absorbing member sliding surface 542 and the pressure vessel mounting bracket sliding surface 552 would slideably engage with one another in an axial direction. A pressure vessel mount biasing element 536 can be provided between the pressure vessel mount impact absorbing member 540 and the pressure vessel mounting bracket 550. The pressure vessel mount biasing element 536 provides a biasing force between the pressure vessel mount impact absorbing member 540 and the pressure vessel mounting bracket 550. A pressure vessel mounting bracket assembly flange 560 can be provided at a distal, mounting end of the pressure vessel mounting bracket 550. One or more pressure vessel mounting bracket assembly apertures 562 can be formed through the pressure vessel mounting bracket assembly flange 560, wherein the one or more pressure vessel mounting bracket assembly apertures 562 are provided to assemble the pressure vessel mounting bracket assembly flange 560 to a respective end of the electronic conveyance vehicle (ECV) (mobility scooter) 100. Although it is not included in the illustration, a dampener can be incorporated into the mounting assembly of the compression element backed pressure vessel 500. The mounting assembly can include at least one of the pressure vessel mount biasing element 536 and the dampener. A stop can also be included, where the stop retains the pressure vessel mount impact absorbing member 540 and the pressure vessel mounting bracket 550 assembled to one another. The stop can be a screw or a bolt inserted through a slot formed through the pressure vessel mount impact absorbing member 540 and secured into the pressure vessel mounting bracket 550, where the screw or bolt would slide along a length of the slot. The screw or bolt are suggested, as they enable removal and separation of the two elements for servicing, repair, replacement, and the like. The stop fastener inserted through a slot and secured to a second sliding object is only one example of a design to retain two sliding elements as a single assembly. It is understood that any arrangement can be integrated to provide the same function. Although the illustrated mounting assembly is in one exemplary configuration, it is understood that the mounting assembly can be of any suitable design and include any of the necessary elements as desired, included a sliding arrangement, a mounting element, a biasing element (tensile and/or compression), a dampener, and the like.

Figure 11:
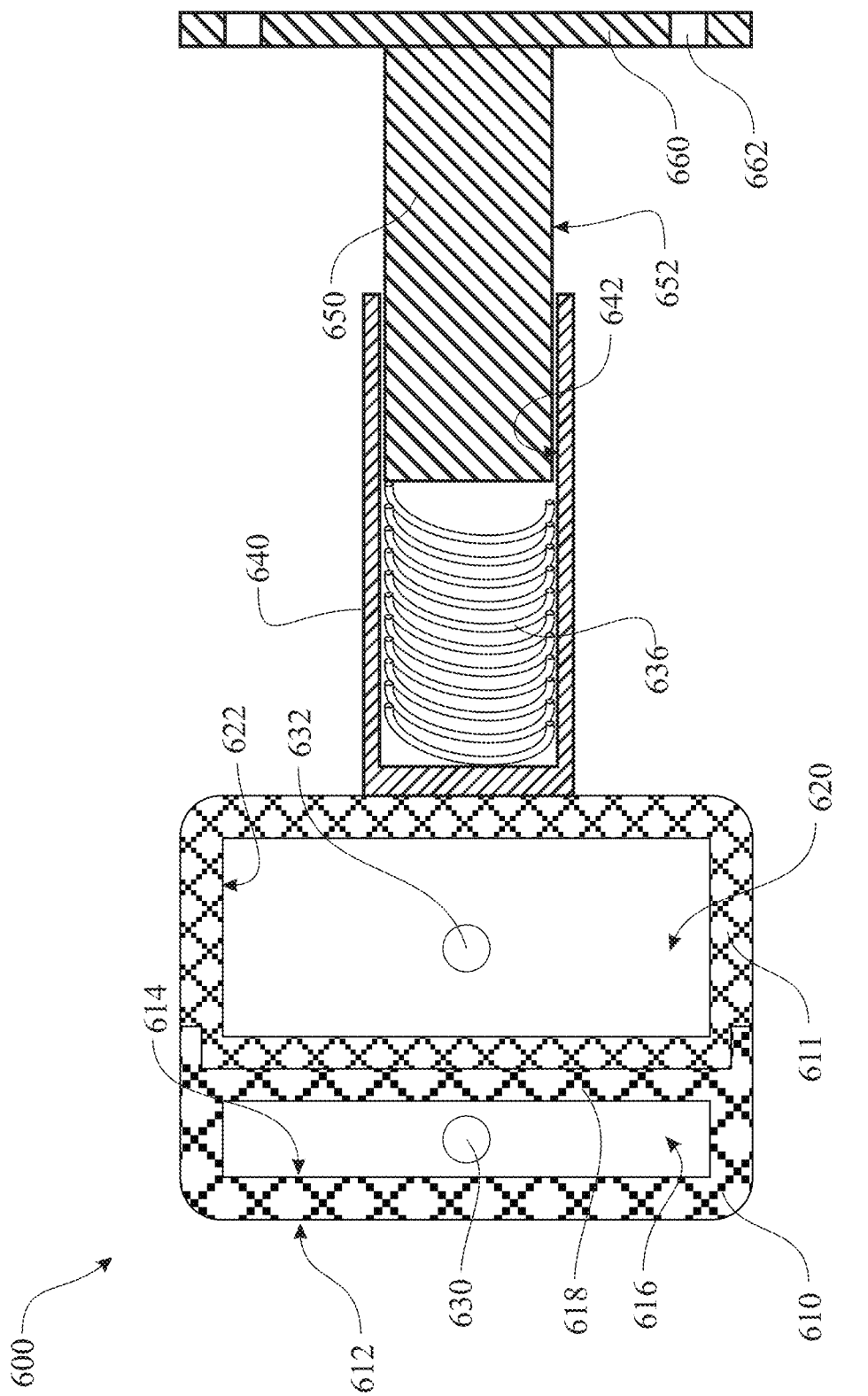
FIG. 11 presents a cross section view of a forth exemplary pressure vessel comprising a unsealed pressure vessel that is arranged to work in concert with a sealed pressure.

A compression element backed pressure vessel 600, illustrated in FIG. 11, is a third exemplary variant of the pressure vessel 200, 202. The compression element backed pressure vessel 500 and the compression element backed pressure vessel 600 have a number of like elements. Like elements of the compression element backed pressure vessel 600 and the compression element backed pressure vessel 500 are numbered the same, wherein elements associated with the compression element backed pressure vessel 600 are preceded by the numeral "6". The compression element backed pressure vessel 500 includes a sealed pressure volume 516 in conjunction with the compression element 520. The sealed pressure volume 516 is defined by a compression element backed pressure vessel body interior surface 514 of the compression element backed pressure vessel body 510 and an interior surface of each compression element backed pressure vessel end wall 518.

It is also understood that the compression element backed pressure vessel 500 can be an unsealed pressure volume 516. The compression element backed pressure vessel 600 includes both, a compression element backed sealed pressure vessel interior void 616 and a compression element backed unsealed pressure vessel interior void 620. The exemplary illustration of the compression element backed pressure vessel 600 introduces an arrangement where a compression element backed pressure vessel body 610 is manufactured of a first material and a compression element body 611 is manufactured of a second material. The material of the compression element backed pressure vessel body 610 is preferably more compliant than the material of the compression element body 611. This difference enables compression of the compression element backed pressure vessel body 610 prior to compression of the compression element body 611. The compression of the compression element backed pressure vessel body 610 actuates the system to stop the electronic conveyance vehicle (ECV) (mobility scooter) 100 from the direction of travel. The compression element backed sealed pressure vessel interior void 616 and the compression element backed unsealed pressure vessel interior void 620 can be fabricated as a single unitary component, a single assembly, or separate components. Although the illustration arranges the compression element backed sealed pressure vessel interior void 616 forward of the compression element backed unsealed pressure vessel interior void 620, it is understood that the compression element backed sealed pressure vessel interior void 616 can be located rearward of the compression element backed unsealed pressure vessel interior void 620. This configuration sensitizes the system to detect minimal contact with a person or an object, while maintaining a capability of collapsing a contact element without increasing a force that would be applied to the person or object that is contacted. The pressure within the compression element backed sealed pressure vessel interior void 616 would increase, but only to a limited value, whereas the pressure in the compression element backed unsealed pressure vessel interior void 620 remains constant or very slightly elevated and minimally increases the force that would be applied to the person or object that is contacted. In this configuration, the system optimizes the sensitivity to contact while retaining a minimal increase in force applied to the contacted person or object.

The exemplary compression element backed pressure vessel 600, and any other variant, can be modified where the mechanical biasing element 636 can be replaced with a magnetic resistance system. For example, the magnetic resistance system mimic a system referred to as a "BOSE suspension system. This arrangement limits a resistive force to one that would not harm an object, and more specifically, a person, when the object and the at least one pressure vessel contact one another.

Figure 12:
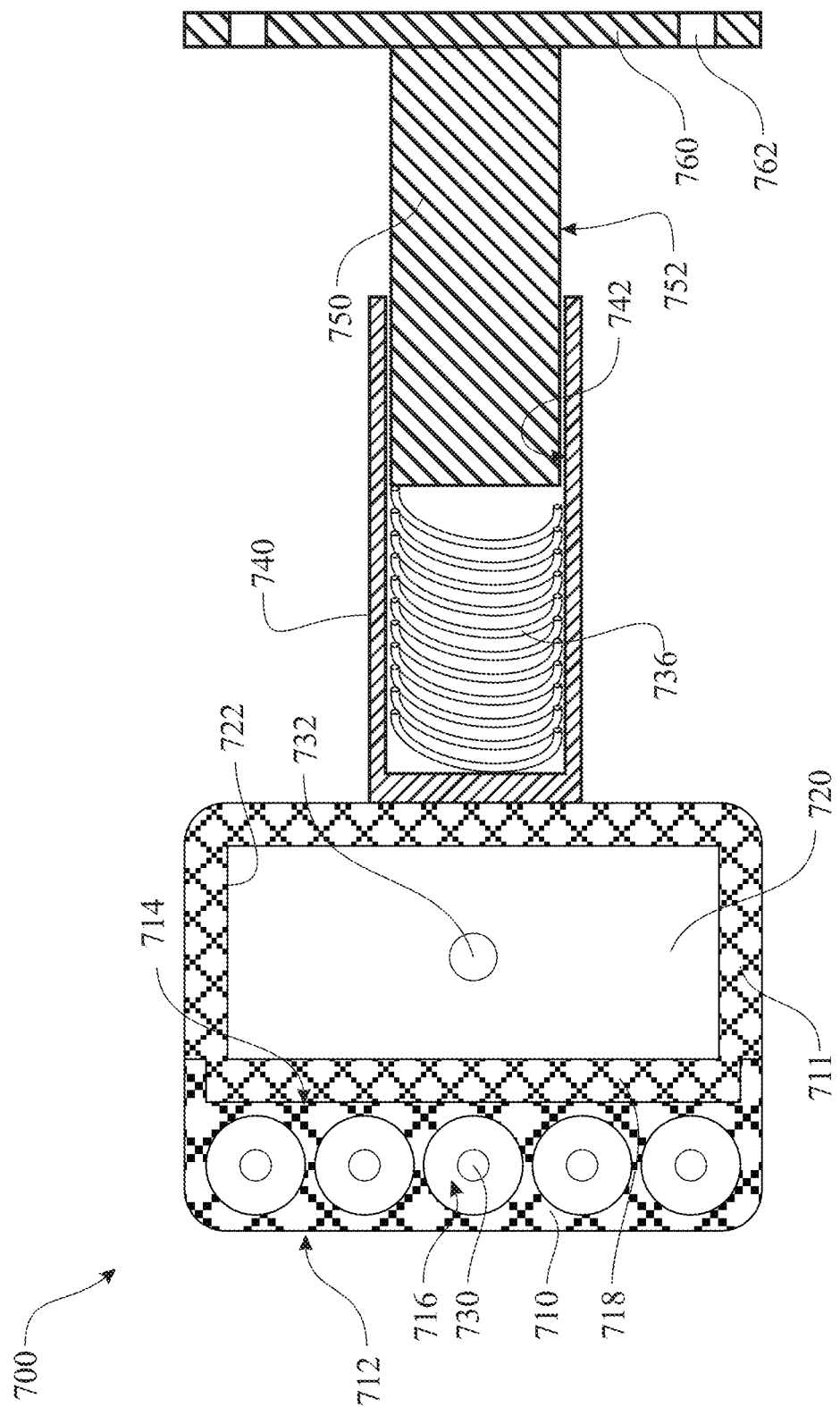
FIG. 12 presents a cross section view of a variant of the forth exemplary pressure vessel originally introduced in FIG. 11, wherein the variant includes a plurality of sealed pressure vessels that is arranged to work in concert with a unsealed pressure vessel, where the plurality of sealed pressure vessels are integrally formed within a pressure vessel body.

A compression element backed pressure vessel 700, illustrated in FIG. 12, is a variant of the exemplary compression element backed pressure vessel 600. The compression element backed pressure vessel 600 and the compression element backed pressure vessel 700 have a number of like elements. Like elements of the compression element backed pressure vessel 700 and the compression element backed pressure vessel 600 are numbered the same, wherein elements associated with the compression element backed pressure vessel 700 are preceded by the numeral "7". The compression element backed pressure vessel 600 includes a compression element backed pressure vessel body 610 having a single compression element backed sealed pressure vessel interior void 616. The compression element backed pressure vessel 700 includes a plurality of compression element backed sealed pressure vessel interior voids 716 formed within the compression element backed pressure vessel body 710. The inclusion of the plurality of compression element backed sealed pressure vessel interior voids 716 takes advantage of multiple, smaller diameter pressure vessels distally spaced for sensing pressure resulting from contact. Each compression element backed sealed pressure vessel interior void 716 can be in pneumatic communication with a respective rear pneumatic operating switch (pressure sensor) 730. This arrangement also provides redundancy.

Figure 13:
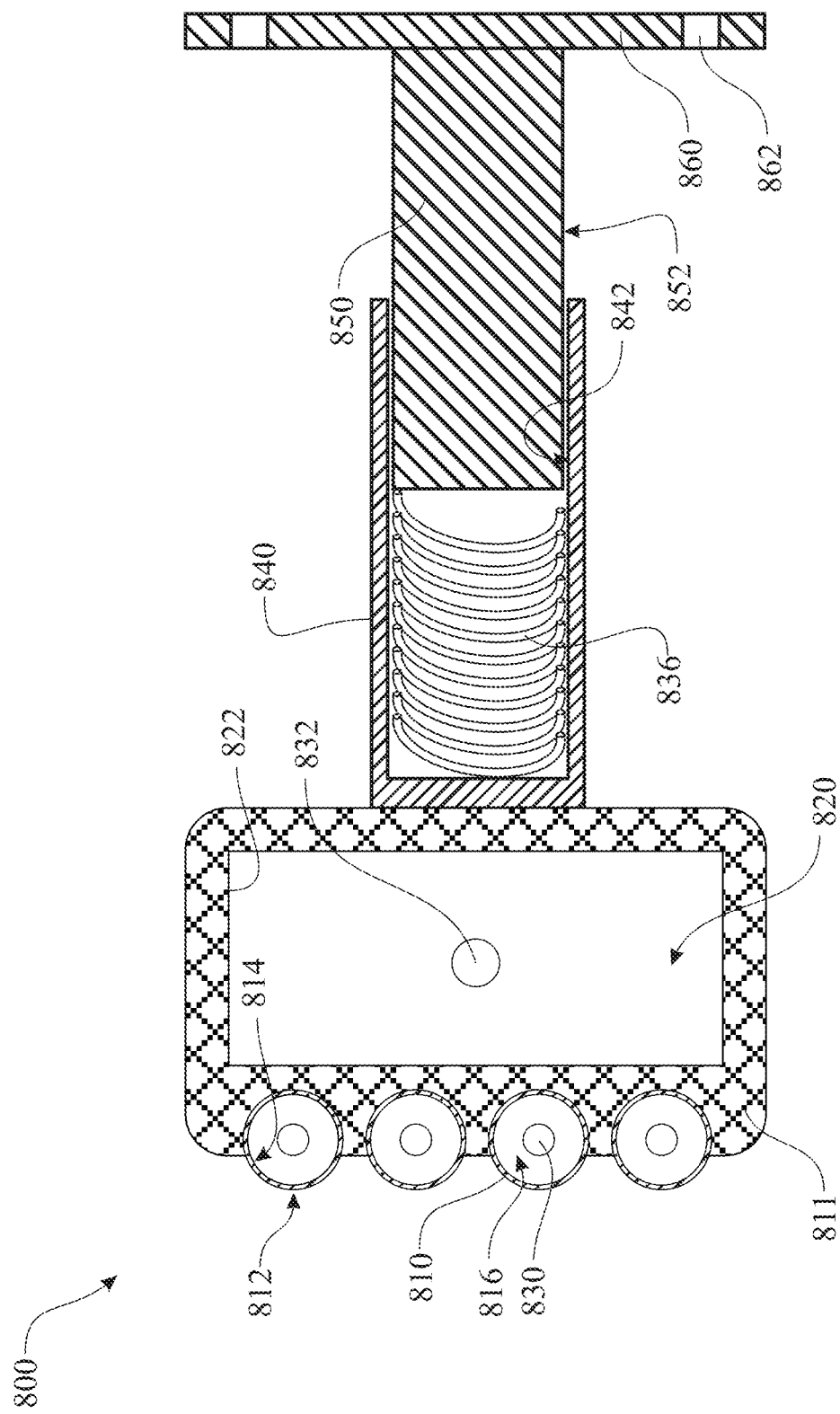
FIG. 13 presents a cross section view of a second variant of the forth exemplary pressure vessel originally introduced in FIG. 11, wherein the variant includes a plurality of sealed pressure vessels that is arranged to work in concert with a unsealed pressure vessel, where the plurality of sealed pressure vessels are arranged having a contacting surface extending forward of a face of a compression element body.
Figure 14:
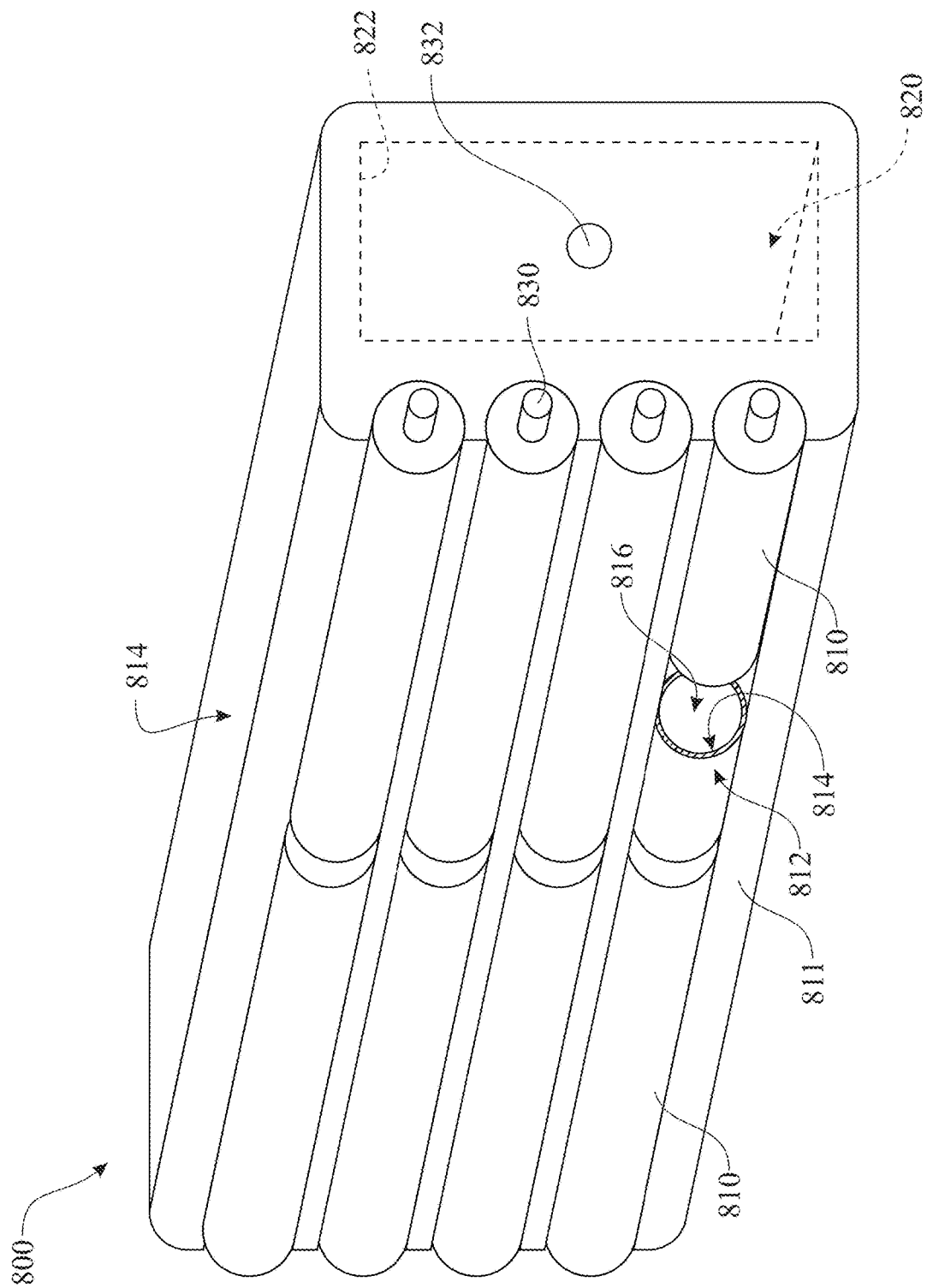
FIG. 14 presents an isometric view of a pressure monitoring section of the second variant of the forth exemplary pressure vessel originally introduced in FIG. 13.

A compression element backed pressure vessel 800, illustrated in FIGS. 13 and 14, is another variant of the exemplary compression element backed pressure vessel 600, more specifically, a variant of the compression element backed pressure vessel 700. The compression element backed pressure vessel 700 and the compression element backed pressure vessel 800 have a number of like elements. Like elements of the compression element backed pressure vessel 800 and the compression element backed pressure vessel 700 are numbered the same, wherein elements associated with the compression element backed pressure vessel 800 are preceded by the numeral "8". The compression element backed pressure vessel 700 includes a plurality of compression element backed sealed pressure vessel interior voids 716 formed within the compression element backed pressure vessel body 710. Conversely, the compression element backed pressure vessel 800 includes a plurality of pressure vessel bodies 810, each pressure vessel body 810 are seated within a groove formed in a compression element body 811. Each pressure vessel body 810 includes a tubular sidewall defining a pressure vessel body exterior surface 812 and a pressure vessel body interior surface 814. Each pressure vessel body 810 can be retained within the respective groove by any suitable means, including an adhesive, a mechanical interface (as shown), and the like. The compression element backed pressure vessel 800 functions in a manner that is similar to the function of the compression element backed pressure vessel 700. Additional details of the compression element backed pressure vessel 800 are presented in an isometric front view, illustrated in FIG. 14. The compression element backed pressure vessel 800 can include one or more pressure vessel bodies 810 inserted in each groove. The grooves are shown extending horizontally. In an alternate arrangement, the grooves and respective pressure vessel bodies 810 can be placed in a vertical orientation, a diagonal orientation, or any combination thereof. Operation of the compression element backed pressure vessel 800 is similar o the operation of the compression element backed pressure vessel 700. The compression element backed pressure vessel 500, 600, 700, 800 can collectively include at least one pressure vessel 516, 616, 716, 816.

Figure 15:
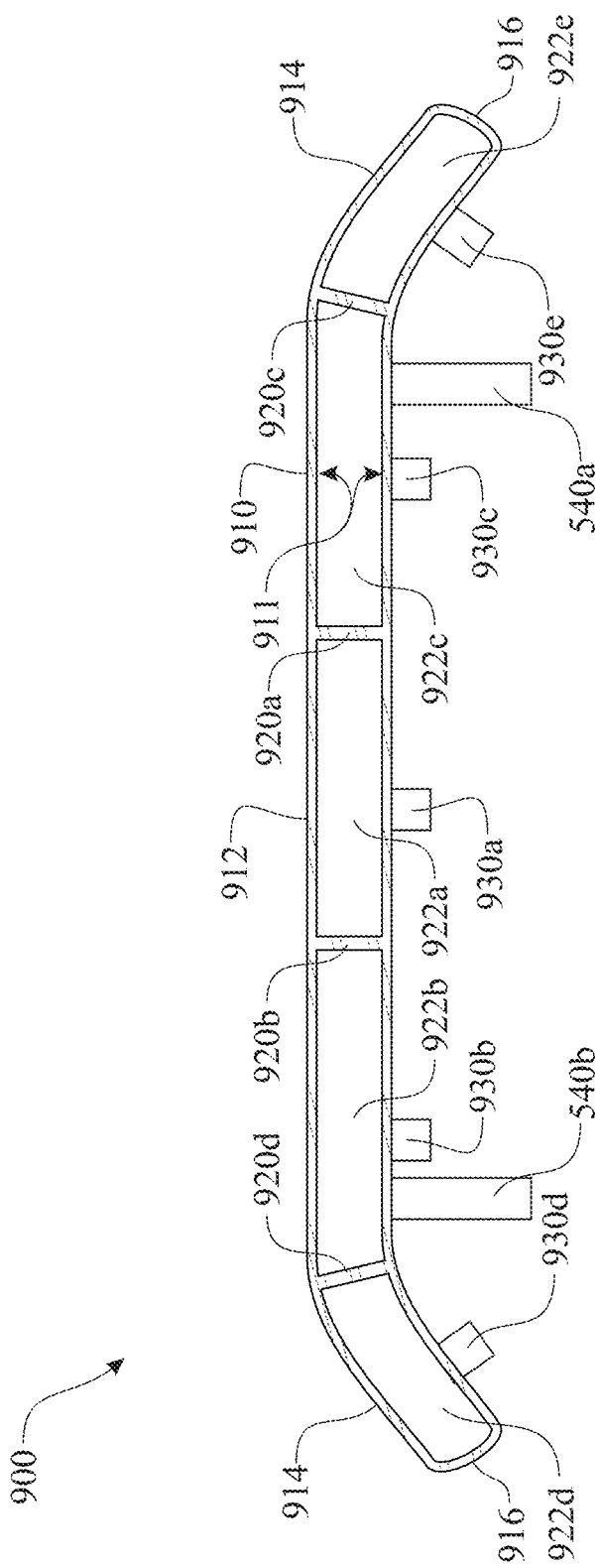
FIG. 15 presents a top section view of a fifth exemplary pressure vessel having an interior volume that is divided into a plurality of pressure segments, each pressure segment being monitored by a respective pressure sensor.

A segmented pressure vessel 900, illustrated in FIG. 15, is yet another variant of the pressure vessel 200, 202. The segmented pressure vessel 900 introduces segments into the pressure vessel 200, 202. In the exemplary illustration, the segmented pressure vessel 900 includes a segmented pressure vessel primary body 910 having a segmented pressure vessel primary body front section 912 and a segmented pressure vessel primary body angular side section 914 located at each end of the segmented pressure vessel primary body front section 912. The exemplary segmented pressure vessel primary body front section 912 is segmented into three sections: a pressure vessel central pressure segment 922*a*, a pressure vessel central left pressure segment 922*b*, and a pressure vessel central right pressure segment 922*c*. The pressure vessel central pressure segment 922*a* is bound by a pressure vessel right central segment barrier 920*a*, a pressure vessel left central segment barrier 920*b*, and the interior surface 911 of the segmented pressure vessel primary body 910. The pressure vessel central left pressure segment 922*b* is bound by the pressure vessel left central segment barrier 920*b*, a pressure vessel left outer segment barrier 920*d*, and the interior surface 911 of the segmented pressure vessel primary body 910. The pressure vessel central left pressure segment 922*b* is located on a first side of the pressure vessel central pressure segment 922*a*. The pressure vessel central right pressure segment 922*c* is bound by the pressure vessel right central segment barrier 920*a*, a pressure vessel right outer segment barrier 920*c*, and the interior surface 911 of the segmented pressure vessel primary body 910. The pressure vessel central right pressure segment 922*c* is located on a second side of the pressure vessel central pressure segment 922*a*, wherein the first side of the pressure vessel central pressure segment 922*a* and the second side of the pressure vessel central pressure segment 922*a* are opposite one another.

Figure 4:
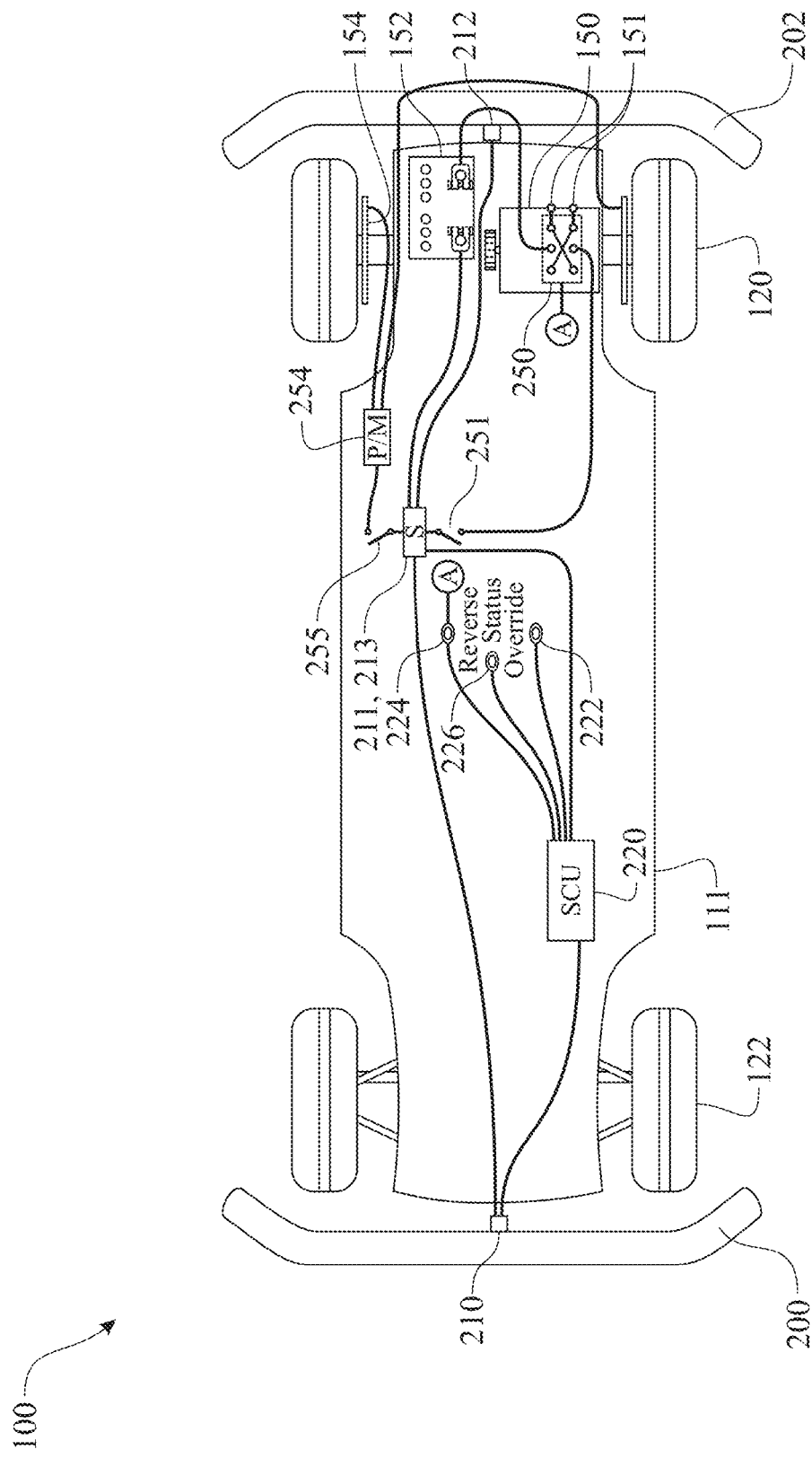
FIG. 4 presents a top view of the exemplary electronic conveyance vehicle (ECV) (mobility scooter) originally introduced in FIG. 1, wherein the body of the electronic conveyance vehicle (ECV) (mobility scooter) and a seat are removed.

A first segmented pressure vessel primary body angular side section 914 includes a pressure vessel outer left pressure segment 922*d* bound by an interior surface of a first segmented pressure vessel primary end cap 916, the pressure vessel left outer segment barrier 920*d*, and the interior surface 911 of the segmented pressure vessel primary body 910. Similarly, a second segmented pressure vessel primary body angular side section 914 includes a pressure vessel outer right pressure segment 922*e* bound by an interior surface of a second segmented pressure vessel primary end cap 916, the pressure vessel right outer segment barrier 920*c*, and the interior surface 911 of the segmented pressure vessel primary body 910. Each segmented pressure vessel primary body angular side section 914 is angled in a direction that is outward from the center and in a direction of a respective mount 540*a*. 540*b*. Each segmented pressure vessel primary body angular side section 914 is angled respective to the segmented pressure vessel primary body front section 912 to monitor for contact with objects when the electronic conveyance vehicle (ECV) (mobility scooter) 100 is turning. Each segmented pressure vessel primary body angular side section 914 is preferably sized to extend outward of the respective wheel 120, 122, as best illustrated in FIG. 4.

Each segmented pressure chamber 922*a*, 922*b*, 922*c*, 922*d*, 922*e* would be monitored by a respective pressure sensor and/or pneumatic switch 930*a*, 930*b*, 930*c*, 930*d*, 930e. In an alternative arrangement (not shown), two or more pressure chambers 922a, 922b, 922c. 922d, 922e can be monitored by a single pressure sensor and/or pneumatic switch 930a, 930b, 930c, 930d, 930e.

Two or more pressure vessel mount impact absorbing members 540a, 540b are assembled to the segmented pressure vessel primary body 910. Each pressure vessel mount impact absorbing member 540a. 540b is assembled to a respective location on the electronic conveyance vehicle (ECV) (mobility scooter) 100. The assembly arrangement of the pressure vessel mount impact absorbing members 540a, 540b can be adjustable, include adapters, or be interchangeable with different designs to provide for assembly to different electronic conveyance vehicles (ECV) (mobility scooters) 100.

Figure 16:
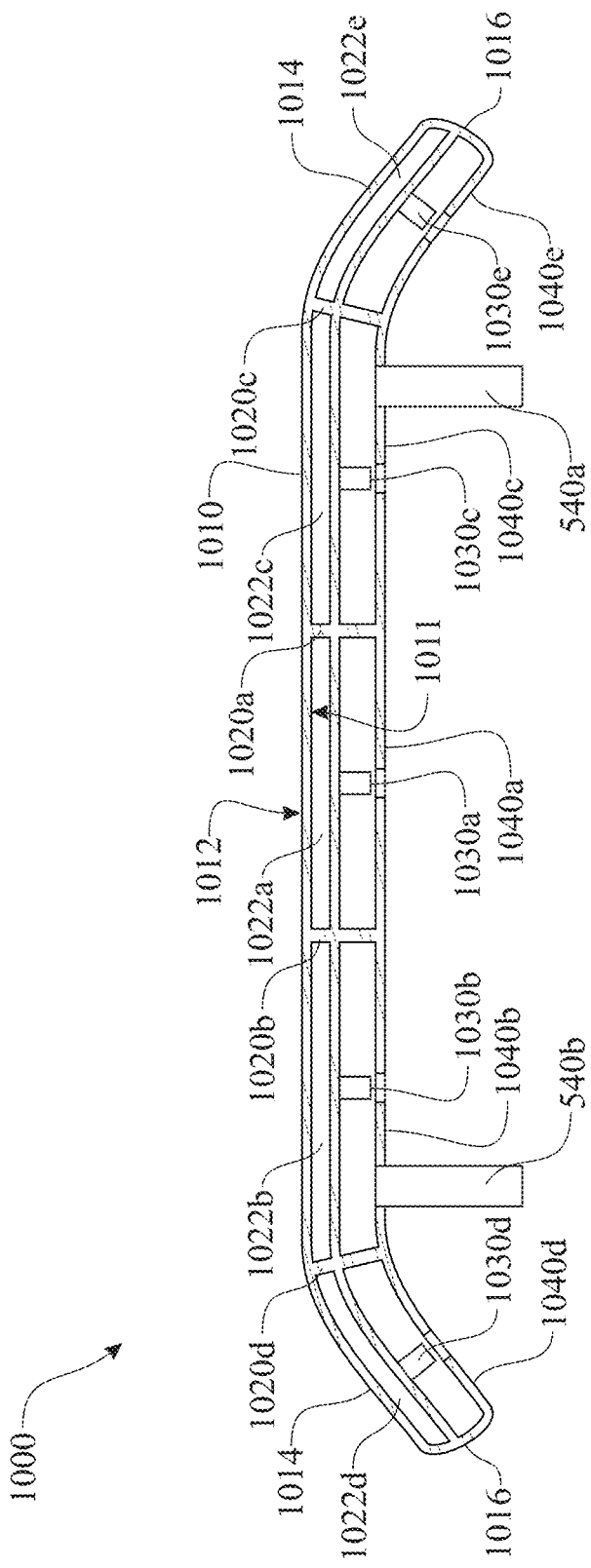
FIG. 16 presents a top section view of a modified variant of the fifth exemplary pressure vessel originally introduced in FIG. 15, wherein the pressure vessel is reduced in depth and backed by a collapsing compression element.

A segmented pressure vessel 1000, illustrated in FIG. 16, is a variant of the exemplary segmented pressure vessel 900. The segmented pressure vessel 900 and the segmented pressure vessel 1000 have a number of like elements. Like elements of the segmented pressure vessel 1000 and the segmented pressure vessel 900 are numbered the same, wherein elements associated with the segmented pressure vessel 1000 are preceded by the numeral "10". The segmented pressure vessel 900 includes a series of pressure vessels 922a, 922b, 922c, 922d, 922e in a linear arrangement. The pressure vessels 922a, 922b, 922c, 922d, 922e can be integrally formed along a length of the bumper. The rear of the pressure vessels 922a, 922b. 922c. 922d, 922e is assembled to the pressure vessel mount impact absorbing member 540a, 540b.

Conversely, the segmented pressure vessel 1000 is designed where a depth (horizontal dimension) of the pressure vessels 1022a, 1022b, 1022c, 1022d, 1022e is smaller than a depth of the pressure vessels 922a, 922b, 922c, 922d, 922e. Additionally, the segmented pressure vessel 1000 includes a collapsible section 1040a, 1040b, 1040c, 1040d, 1040e located rearward of each respective pressure vessels 1022a, 1022b, 1022c, 1022d, 1022e. Each collapsible section 1040a, 1040b, 1040c, 1040d, 1040e would function in a manner similar to the compression element body 611.

Figure 17:
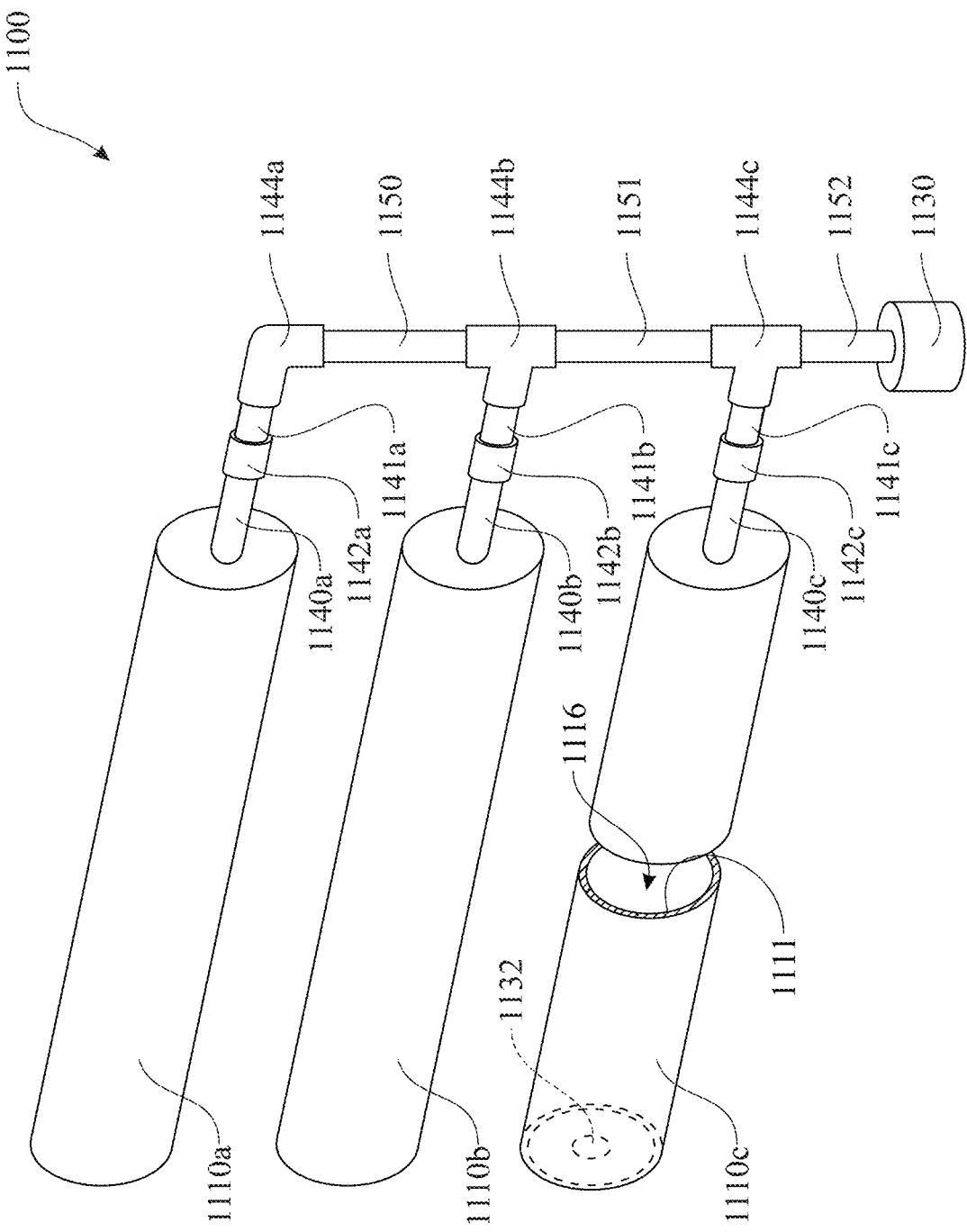
FIG. 17 presents a front isometric view of an exemplary pressure management system utilizing pressure vessels of different diameters to amplify a pressure change resulting from an impact at a pressure sensor.
Figure 18:
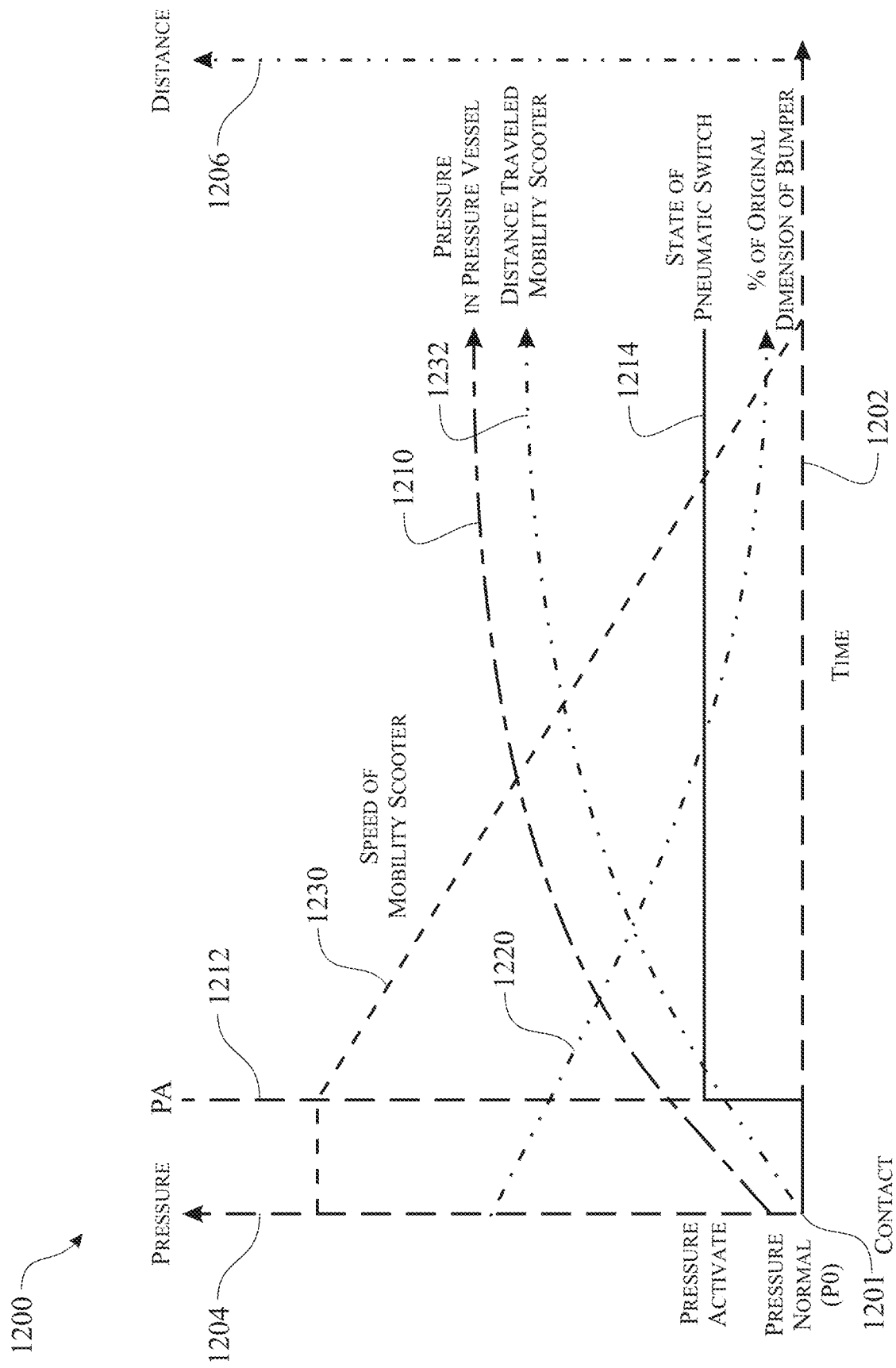
FIG. 18 presents an exemplary chart describing interactions of various events associated with a method of operation of the system.

The system can include a pressure concentration system 1100, as shown in an exemplary illustration presented in FIG. 17. The exemplary pressure concentration system 1100 includes a first high volume pressure receiving vessel 1110a, a second high volume pressure receiving vessel 1110b, and a nth high volume pressure receiving vessel 1110c (representing any total number of high volume pressure receiving vessels 1110a, 1110b, 1110c. Each high volume pressure receiving vessel 1110a, 1110b, 1110c is formed having a tubular wall extending between a first end wall and a second end wall. The tubular wall includes a high volume pressure receiving vessel interior surface 1111. The high volume pressure receiving vessel interior surface 1111 defines a high volume pressure receiving vessel interior void 1116. A high volume pressure receiving vessel air replenishing valve 1132 is provided in one respective end wall of the high volume pressure receiving vessel 1110a, 1110b, 1110c. Each high volume to reduced volume manifold delivery tube 1140a, 1140b, 1140c is provided in fluid communication with each respective high volume pressure receiving vessel 1110a, 1110b, 1110c on a first end and a high volume to reduced volume check valve 1142a, 1142b, 1142c on a second end. In an alternative arrangement, each high volume to reduced volume check valve 1142a, 1142b, 1142c can be assembled directly to the end wall of the respective high volume pressure receiving vessel 1110a, 1110b, 1110c. A high volume to reduced volume post-check valve transfer tube 1141a, 1141b, 1141c is provided in fluid communication with each respective high volume to reduced volume check valve 1142a, 1142b, 1142c on a first end and a manifold assembly element 1144a. 1144b, 1144c on a second end. Each of the manifold assembly elements 1144a, 1144b, 1144c is assembled to a respective manifold collection pipe segment 1150, 1151, 1152. The first manifold collection element (elbow fitting) 1144a provides fluid communication between the first high volume to reduced volume post-check valve transfer tube 1141a and the first manifold collection pipe segment 1150. The second manifold collection element (T-fitting) 1144b provides fluid communication between the second high volume to reduced volume post-check valve transfer tube 1141b, the first manifold collection pipe segment 1150, and the second manifold collection pipe segment 1151. The nth manifold collection element (T-fitting) 1144c provides fluid communication between the nth high volume to reduced volume post-check valve transfer tube 1141c, the second manifold collection pipe segment 1151, and the delivery manifold collection pipe segment 1152. The delivery manifold collection pipe segment 1152 delivers the change in pressure to a pneumatic sensor 1130. The diameter of each of the manifold elements is preferably smaller than the diameters of each high volume pressure receiving vessel 1110a. 1110b, 1110c. With this arrangement, the change in volume of the high volume pressure receiving vessel 1110a, 1110b, 1110c when compressed is amplified when the pressure is transferred to the manifold elements. Each high volume to reduced volume check valve 1142a, 1142b, 1142c ensures against backflow of the pressure into any of the other high volume to reduced volume check valves 1142a, 1142b, 1142c. A high volume pressure receiving vessel air replenishing valve 1132 is provided in an opposite end wall of each high volume to reduced volume check valve 1142a, 1142b, 1142c. The high volume pressure receiving vessel air replenishing valve 1132 provides an ability for air to return to the high volume pressure receiving vessel interior void 1116 of each high volume to reduced volume check valve 1142a. 1142b, 1142c, upon release of the compression force. This arrangement can be integrated into any of the above versions of the system.

Each of the above variants of pressure vessels includes certain features. It is understood that features of one illustration can be integrated into a different illustrated variant. All variations are not illustrated, as the number of illustrations would be significant.

Operation of the injury and damage mitigation system is presented in FIGS. 18 through 21. The interactions of elements are best presented in a mobility scooter impact safety operational chart 1200 illustrated in FIG. 18. The mobility scooter impact safety operational chart 1200 references a state of various functions respective to a pressure (identified by a pressure reference 1204) generated within the pressure vessel 200, 202 and time 1202. The process initiates at a point of initial contact 1201, where one pressure vessel 200, 202 contacts a person or an object. Upon contact, the dimension of the pressure vessel 200, 202 decreases in the direction of travel, as represented by a percent horizontal diameter of pressure vessel bumper over time 1220. As the dimension of the pressure vessel 200, 202 decreases in the direction of travel, the pressure within the interior volume of the pressure vessel 200, 202 increases, as represented by a pressure in pressure vessel curve over time 1210. The increase in pressure within the interior volume of the pressure vessel 200, 202 is identified by the pneumatic operating switch (pressure sensor) 210, 212, as represented by a state of pneumatic switch over time 1214. A reference for the distance traveled is represented by a distance reference 1206. The pneumatic operating switch (pressure sensor) 210, 212 can be a digital device, as shown, where the output is either "off" or "on" or an analog device, which outputs a variable signal. When using a digital sensing device, upon reaching a preset increase in pressure, the pneumatic operating switch (pressure sensor) 210, 212 activates, as identified by an activation pressure reference 1212 shown on the mobility scooter impact safety operational chart 1200. Upon activation of the pneumatic operating switch (pressure sensor) 210, 212, the system causes the electronic conveyance vehicle (ECV) (mobility scooter) 100 to cease movement in the direction of travel, where the distance of travel is identified by a mobility scooter speed over time 1230. This can be accomplished by reducing power provided to the ECV drive motor 150, interrupting power provided to the ECV drive motor 150, and/or applying a braking using the brake assembly 154. As the electronic conveyance vehicle (ECV) (mobility scooter) 100 continues traveling in the direction of travel, the contact with the person or object continues to reduce the dimension of the pressure vessel 200, 202 in the direction of travel, as represented by a percent horizontal diameter of pressure vessel bumper over time 1220, until the movement of the electronic conveyance vehicle (ECV) (mobility scooter) 100 ceases. As illustrated, at the time when the movement of the electronic conveyance vehicle (ECV) (mobility scooter) 100 ceases, the dimension of the bumper is not reduced to zero (where the contact side of the pressure vessel 200, 202 would be compressed against the support side of the pressure vessel 200, 202). Since the pressure vessel 200, 202 retains a gap between the contact side of the pressure vessel 200, 202 and the support side of the pressure vessel 200, 202, the pressure vessel only applies a nominal force to the person or object contacted.

Figure 19:
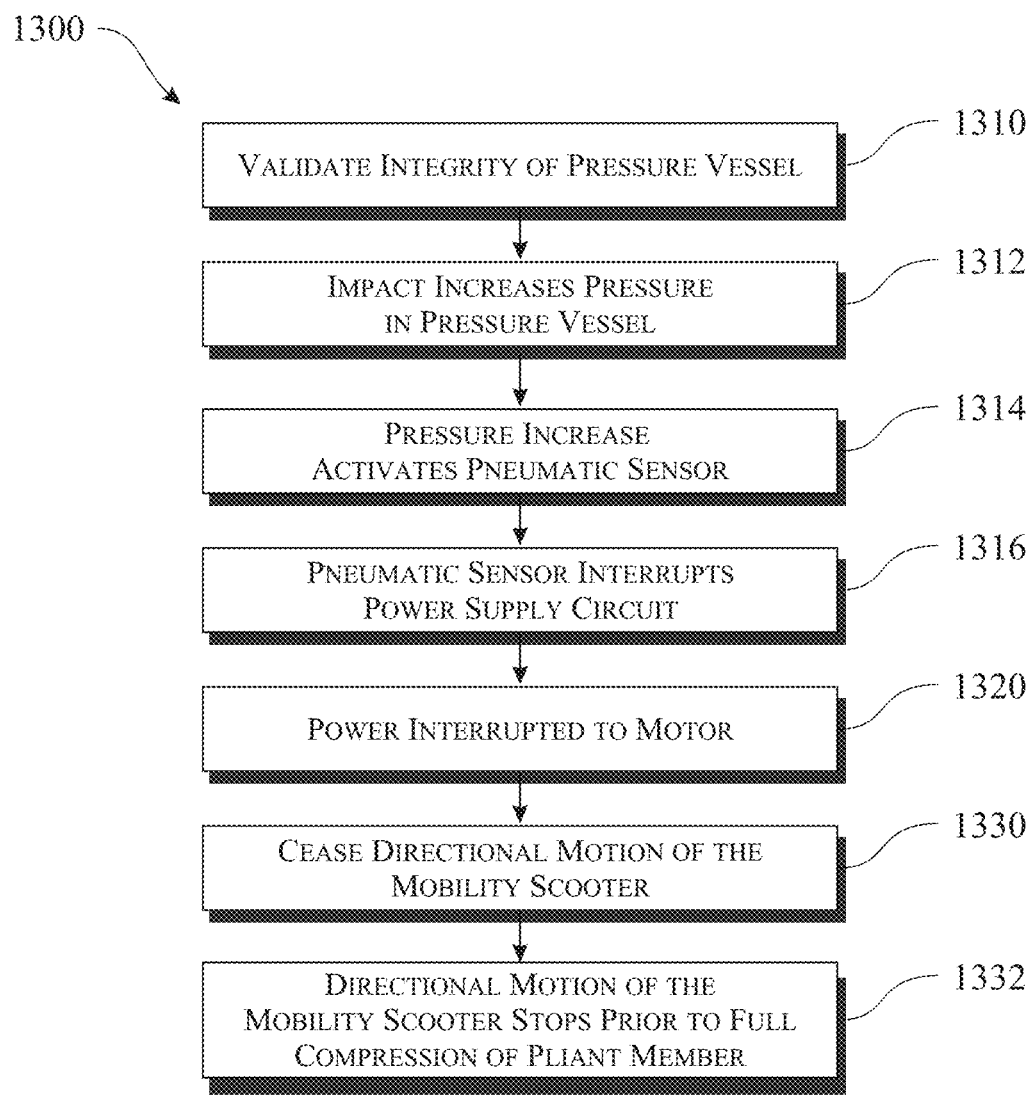
FIG. 19 presents an exemplary flow diagram describing interactions a first exemplary method of operation of the system, wherein the first exemplary method employs control of power to the motor.
Figure 20:
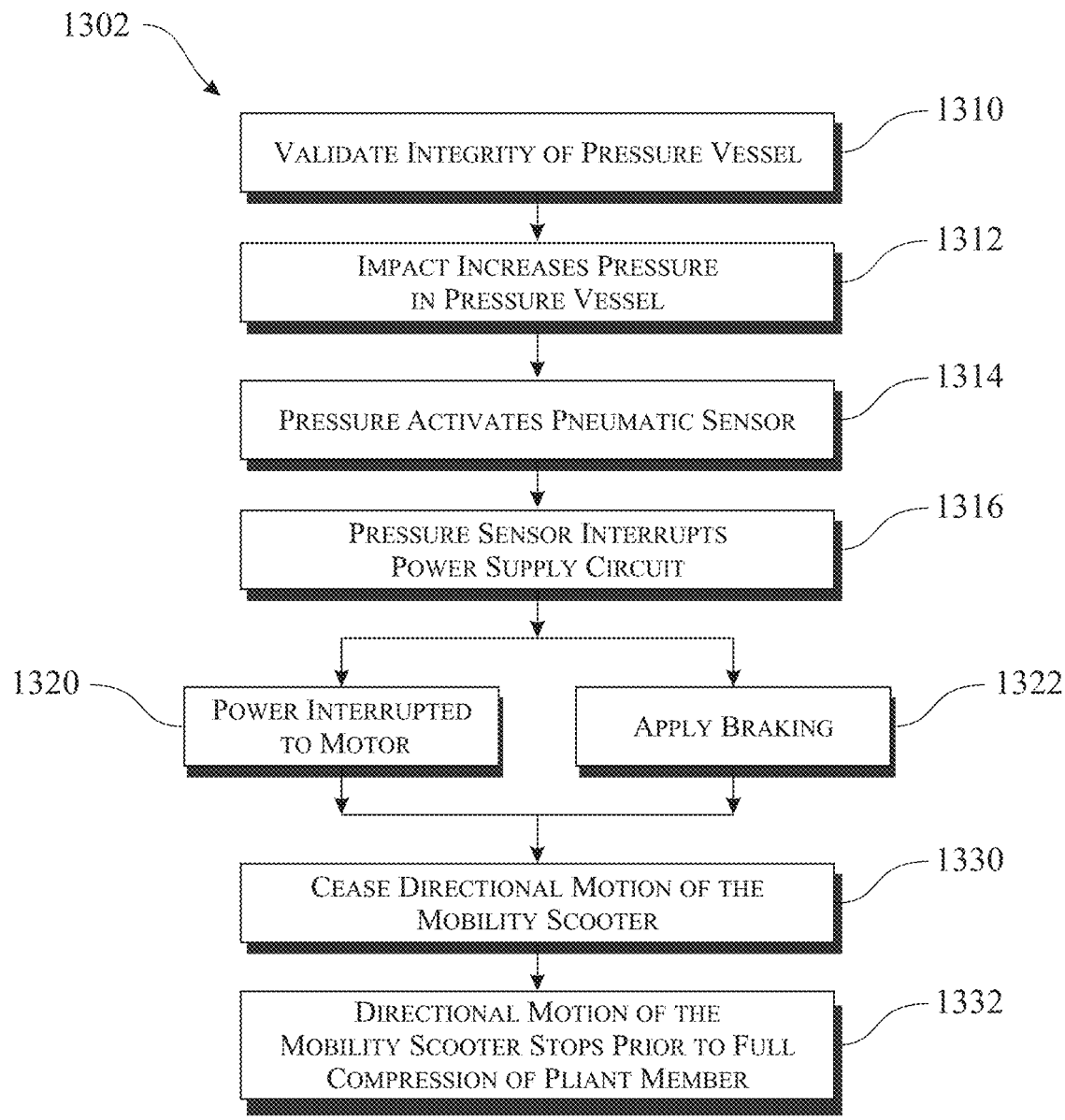
FIG. 20 presents an exemplary flow diagram describing interactions a second exemplary method of operation of the system, wherein the second exemplary method employs control of power to the motor and/or actuation of a braking system.
Figure 21:
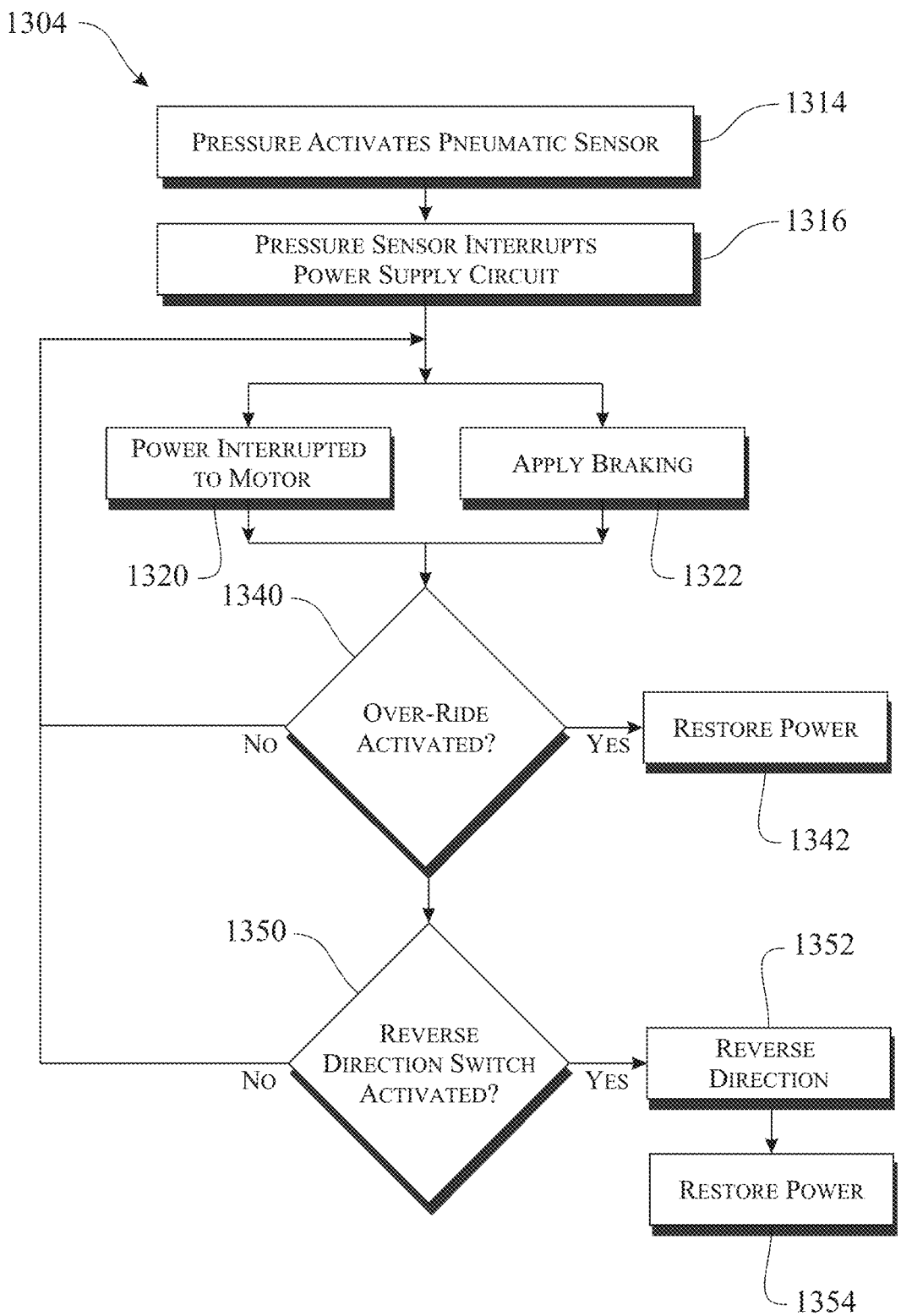
FIG. 21 presents an exemplary flow diagram describing interactions an enhanced exemplary method of operation of the system, wherein the enhanced exemplary method introduces an optional override function and an optional reverse function.

The basic operation of the injury and damage mitigation system is presented in a mobility scooter impact safety operational flow diagram 1300 illustrated in FIG. 19. The mobility scooter impact safety operational flow diagram 1300 can initiate with an optional step of validating an integrity of the pressure vessel 200, 202 (step 1310). This can be accomplished by any of a number of options. In one option, the pressure vessel 200, 202 can remain sealed, having an internal pressure that is greater than an ambient pressure. The pneumatic operating switch (pressure sensor) 210, 212 would sense the internal pressure and compare the internal pressure to the ambient pressure. As long as the pneumatic operating switch (pressure sensor) 210, 212 determines that the internal pressure is greater than the ambient pressure, the system considers the pressure vessel 200, 202 to have an acceptable integrity. The rider initiates motion of the electronic conveyance vehicle (ECV) (mobility scooter) 100. As the electronic conveyance vehicle (ECV) (mobility scooter) 100 is traveling, the pressure within the interior of the pressure vessel 200, 202 remains constant until the pressure vessel 200, 202 contacts a person or an object. Upon contact, the pressure within the interior of the pressure vessel 200, 202 increases (step 1312).

As the pressure within the interior of the pressure vessel 200, 202 increases, the pneumatic operating switch (pressure sensor) 210, 212 identifies the change in pressure (step 1314). The identified change in pressure directs the system to slow the motion of the electronic conveyance vehicle (ECV) (mobility scooter) 100 (step 1316). This can be accomplished in any of a number of ways. In mobility scooter impact safety operational flow diagram 1300, the exemplary method of slowing the electronic conveyance vehicle (ECV) (mobility scooter) 100 is by one of (a) reducing or (b) interrupting power provided from the ECV power supply (battery) 152 to the ECV drive motor 150 (step 1320). In an mobility scooter impact safety operational flow diagram 1302 (illustrated in FIG. 20), the exemplary method of slowing the electronic conveyance vehicle (ECV) (mobility scooter) 100 can be accomplished by at least one of (a) reducing or interrupting power provided from the ECV power supply (battery) 152 to the ECV drive motor 150 (step 1320) and applying a braking (step 1322). The movement of the electronic conveyance vehicle (ECV) (mobility scooter) 100 is reduced, preferably until the movement ceases (step 1330). As previously illustrated in FIG. 18, the movement of the electronic conveyance vehicle (ECV) (mobility scooter) 100 ceases prior to complete collapse (full compression) of the pressure vessel 200, 202 (step 1332). It is understood that the pressure vessel 200, 202 can include a sealed pressure vessel and a collapsible un-sealed pressure vessel or other instrument that is compressed during the travel of the electronic conveyance vehicle (ECV) (mobility scooter) 100, while minimally increasing a force applied to the contacted person and/or object.

The injury and damage mitigation system can be enhanced with any of several options. Two exemplary options are introduced in a mobility scooter impact safety operational flow diagram 1304 illustrated in FIG. 21. A first exemplary option is an override switch activation decision (step 1340). The system would receive a signal from the override switch 222. The safety control unit (SCU) 220 would determine if the conditions that the electronic conveyance vehicle (ECV) (mobility scooter) 100 are currently subjected to are acceptable for proceeding with steps associated with an override process (step 1340). Examples of acceptable conditions for overriding the system can include (a) when the pressure within the interior volume of the pressure vessel 200, 202 returns to an original pressure, indicating that the pressure vessel 200, 202 is no longer contacting the person or object; (b) when the pressure is sensed in an outer chamber 622*d*, 622*e* and the system determines that the steering wheel 114 is rotated in a direction that would steer the electronic conveyance vehicle (ECV) (mobility scooter) 100 away from the direction of impact, and (c) any other suitable condition. The safety control unit (SCU) 220 can initially limit the power provided from the ECV power supply (battery) 152 to the ECV drive motor 150 and monitor for any increase in pressure within the pressure vessel 200, 202 to ensure that the conditions are acceptable to continue traveling. In a scenario where the conditions are acceptable for an override, the safety control unit (SCU) 220 would restore power to the system (step 1342). Another override condition could be provided by any movement made by the rider. In one example, the rider can rotate the ECV steering handlebar 114 in a predetermined direction, such as opposite to the current direction of travel. In another example, the rider can cycle the accelerator actuator, cycle the brake actuator, and the like.

In certain conditions, it might be beneficial to turn off the system or override the entire system. For example, when a plurality of electronic conveyance vehicles (ECV) (mobility scooters) 100 are being pushed together by a service person to place the plurality of electronic conveyance vehicles (ECV) (mobility scooters) 100 into storage. It would be suggested to provide a separate method or tool for establishing this configuration to ensure against a rider setting the system into this configuration. One example could be a special key. Another could be a wireless code or reader that is read by the system.

A second exemplary option is a reverse direction decision (step 1350). The system would receive a signal from the directional control switch 224. The safety control unit (SCU) 220 would determine if the conditions that the electronic conveyance vehicle (ECV) (mobility scooter) 100 are currently subjected to are acceptable for proceeding with steps associated with a reverse process (step 1350). In this process, the term reverse is defined as a direction of travel that is opposite to the previous direction of travel when the pressure vessel 200, 202 contacts a person or an object. In a scenario where the conditions are acceptable to engage the electronic conveyance vehicle (ECV) (mobility scooter) 100 in a reverse direction, the safety control unit (SCU) 220 would reverse the direction of travel by reconfiguring the directional control circuit 250 (step 1352) and restoring power to the system (step 1354).

It is understood that the injury and damage mitigation system can additionally employ other sensing devices, such as an Infra-red sensor, an ultrasonic sensor, a camera system, and the like. The limitation with these in use as stand-alone sensing system is that the sensor would be activated upon approaching a person and/or an object and override the movement of the electronic conveyance vehicle (ECV) (mobility scooter) 100. This can be at an undesirable and unnecessary scenario.

The sealed pressure vessel 200, 202 can contain any fluid, including air, a single gas, a combination of gases, a liquid, water, hydraulic fluid, silicone based hydraulic fluid, mineral oil based hydraulic fluid, oil, natural oil, synthetic oil, semi-synthetic or blended oil, antifreeze (such as a mixture of water and either ethylene glycol (EGW) or propylene glycol (PGW)), or any combination thereof. The sealed pressure vessel 200, 202 can include a feature enabling filling of the interior volume thereof with the respective fluid. It is understood that the less compressive the material, the more sensitive the monitoring of an increase in internal pressure upon contact with a person/object.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

Element Description References
Ref No. Description
- 100 electronic conveyance vehicle (ECV) (mobility scooter)
- 102 ECV front end
- 104 ECV rear end
- 110 ECV body
- 111 ECV frame
- 112 ECV seat
- 114 ECV steering handlebar
- 115 ECV steering column
- 120 rear wheel
- 122 front wheel
- 130 left hand controller
- 132 right hand controller
- 134 left hand brake
- 136 right hand brake
- 140 cargo basket
- 150 ECV drive motor
- 152 ECV power supply (battery)
- 154 brake assembly
- 200 front pressure vessel
- 202 rear pressure vessel
- 208 pressure vessel shell
- 208*a* normal operating pressure vessel shell
- 208*b* system activated pressure vessel shell
- 208*c* stopped maximum compression pressure vessel shell
- 209 pressure vessel shell interior surface
- 210 front pneumatic operating switch (pressure sensor)
- 211 front pressure vessel solenoid
- 212 rear pneumatic operating switch (pressure sensor)
- 213 rear pressure vessel solenoid
- 220 safety control unit (SCU)
- 222 override switch
- 224 directional control switch
- 226 system status indicator
- 250 directional control circuit
- 251 operating power safety control switch
- 254 brake pump/motor
- 255 brake piston/pump/motor switch
- 300 pneumatically operated switch
- 310 pneumatic switch tubular body
- 312 pneumatic switch tubular body interior surface
- 320 pneumatic switch pressure end ring
- 322 pneumatic switch pressure end ring flange surface
- 323 pneumatic switch pressure end ring passageway
- 324 pneumatic switch biasing end ring
- 326 pneumatic switch biasing end ring flange surface
- 330 pneumatic switch biasing force adjustment ring
- 332 pneumatic switch biasing force adjustment ring contact surface
- 334 pneumatic switch biasing force adjustment ring adjustment motion
- 336 pneumatic switch biasing element
- 340 pneumatic switch pressure disc
- 342 pneumatic switch pressure disc pressure receiving surface
- 344 pneumatic switch pressure disc motion
- 350 pneumatic switch static pressure initial position first sensing element
- 351 initial position first sensing element electrical conductor
- 352 pneumatic switch static pressure initial position second sensing element
- 353 initial position second sensing element electrical conductor
- 360 pneumatic switch static pressure activation position first sensing element
- 361 activation position first sensing element electrical conductor
- 362 pneumatic switch static pressure activation position second sensing element
- 363 activation position second sensing element electrical conductor
- 400 compression element filled pressure vessel
- 410 compression element filled pressure vessel body
- 412 compression element filled pressure vessel body interior surface
- 414 compression element filled pressure vessel body exterior surface
- 416 compression element filled pressure vessel interior void
- 418 compression element filled pressure vessel end wall
- 420 compression element
- 430 rear pneumatic operating switch (pressure sensor)
- 432 pressure ventilation switch

500 compression element backed pressure vessel
510 compression element backed pressure vessel body
512 compression element backed pressure vessel body exterior surface
514 compression element backed pressure vessel body interior surface
516 compression element backed pressure vessel interior void
518 compression element backed pressure vessel end wall
520 compression element
522 compression element support surface
530 rear pneumatic operating switch (pressure sensor)
536 pressure vessel mount biasing element
540 pressure vessel mount impact absorbing member
540*a* right pressure vessel mount impact absorbing member
540*b* left pressure vessel mount impact absorbing member
542 pressure vessel mount impact absorbing member sliding surface
550 pressure vessel mounting bracket
552 pressure vessel mounting bracket sliding surface
560 pressure vessel mounting bracket assembly flange
562 pressure vessel mounting bracket assembly aperture
600 compression element backed pressure vessel
610 compression element backed pressure vessel body
611 compression element body
612 compression element backed pressure vessel body exterior surface
614 compression element backed pressure vessel body interior surface
616 compression element backed sealed pressure vessel interior void
618 compression element backed pressure vessel end wall
620 compression element interior void
622 compression element body interior surface
630 rear pneumatic operating switch (pressure sensor)
632 pressure ventilation switch
636 pressure vessel mount biasing element
640 pressure vessel mount impact absorbing member
642 pressure vessel mount impact absorbing member sliding surface
650 pressure vessel mounting bracket
652 pressure vessel mounting bracket sliding surface
660 pressure vessel mounting bracket assembly flange
662 pressure vessel mounting bracket assembly aperture
700 compression element backed pressure vessel
710 compression element backed pressure vessel body
711 compression element body
712 compression element backed pressure vessel body exterior surface
714 compression element backed pressure vessel body interior surface
716 compression element backed sealed pressure vessel interior void
718 compression element backed pressure vessel end wall
720 compression element interior void
722 compression element body interior surface
730 rear pneumatic operating switch (pressure sensor)
732 pressure ventilation switch
736 pressure vessel mount biasing element
740 pressure vessel mount impact absorbing member
742 pressure vessel mount impact absorbing member sliding surface
750 pressure vessel mounting bracket
752 pressure vessel mounting bracket sliding surface
760 pressure vessel mounting bracket assembly flange
762 pressure vessel mounting bracket assembly aperture
800 compression element backed pressure vessel
810 pressure vessel body
811 compression element body
812 pressure vessel body exterior surface
814 pressure vessel body interior surface
816 compression element backed sealed pressure vessel interior void
820 compression element interior void
822 compression element body interior surface
830 rear pneumatic operating switch (pressure sensor)
832 pressure ventilation switch
836 pressure vessel mount biasing element
840 pressure vessel mount impact absorbing member
842 pressure vessel mount impact absorbing member sliding surface
850 pressure vessel mounting bracket
852 pressure vessel mounting bracket sliding surface
860 pressure vessel mounting bracket assembly flange
862 pressure vessel mounting bracket assembly aperture
900 segmented pressure vessel
910 segmented pressure vessel primary body
911 segmented pressure vessel primary body interior surface
912 segmented pressure vessel primary body front section
914 segmented pressure vessel primary body angular side section
916 segmented pressure vessel primary end cap
920*a* pressure vessel right central segment barrier
920*b* pressure vessel left central segment barrier
920*c* pressure vessel right outer segment barrier
920*d* pressure vessel left outer segment barrier
922*a* pressure vessel central pressure segment
922*b* pressure vessel central left pressure segment
922*c* pressure vessel central right pressure segment
922*d* pressure vessel outer left pressure segment
922*e* pressure vessel outer right pressure segment
930*a* central pneumatic switch
930*b* central left pneumatic switch
930*c* central right pneumatic switch
930*d* outer left pneumatic switch
930*e* outer right pneumatic switch
1000 segmented pressure vessel
1010 segmented pressure vessel primary body
1011 segmented pressure vessel primary body interior surface
1012 segmented pressure vessel primary body front section
1014 segmented pressure vessel primary body angular side section
1016 segmented pressure vessel primary end cap
1020*a* pressure vessel right central segment barrier
1020*b* pressure vessel left central segment barrier
1020*c* pressure vessel right outer segment barrier
1020*d* pressure vessel left outer segment barrier
1022*a* pressure vessel central pressure segment
1022*b* pressure vessel central left pressure segment
1022*c* pressure vessel central right pressure segment
1022*d* pressure vessel outer left pressure segment
1022*e* pressure vessel outer right pressure segment
1030*a* central pneumatic switch
1030*b* central left pneumatic switch
1030*c* central right pneumatic switch
1030*d* outer left pneumatic switch
1030*e* outer right pneumatic switch
1040*a* collapsible section central segment
1040*b* collapsible section central left segment
1040*c* collapsible section central right segment 1040d collapsible section outer left segment
1040e collapsible section outer right segment
1100 pressure concentration system
1110a first high volume pressure receiving vessel
1110b second high volume pressure receiving vessel
1110c nth high volume pressure receiving vessel
1111 high volume pressure receiving vessel interior surface
1116 high volume pressure receiving vessel interior void
1132 high volume pressure receiving vessel air replenishing valve
1130 pneumatic sensor
1140a first high volume to reduced volume manifold delivery tube
1140b second high volume to reduced volume manifold delivery tube
1140c nth high volume to reduced volume manifold delivery tube
1141a first high volume to reduced volume post-check valve transfer tube
1141b second high volume to reduced volume post-check valve transfer tube
1141c nth high volume to reduced volume post-check valve transfer tube
1142a first high volume to reduced volume check valve
1142b second high volume to reduced volume check valve
1142c nth high volume to reduced volume check valve
1144a first manifold collection element (elbow fitting)
1144b second manifold collection element (T-fitting)
1144c nth manifold collection element (T-fitting)
1150 first manifold collection pipe segment
1151 second manifold collection pipe segment
1152 delivery manifold collection pipe segment
1200 mobility scooter impact safety operational chart
1201 pressure vessel time of initial contact
1202 time reference
1204 pressure reference
1206 distance reference
1210 pressure in pressure vessel curve over time
1212 activation pressure reference
1214 state of pneumatic switch over time
1220 percent horizontal diameter of pressure vessel bumper over time
1230 mobility scooter speed over time
1232 mobility scooter distance traveled over time
1300 mobility scooter impact safety operational flow diagram
1302 mobility scooter impact safety operational flow diagram
1304 mobility scooter impact safety operational flow diagram
1310 validate integrity of pressure vessel
1312 impact increase pressure in pressure vessel
1314 pressure increase activates pneumatic sensor
1316 pneumatic sensor interrupts power supply circuit
1320 power interrupted to motor
1322 system applies brakes
1330 cease directional motion of the mobility scooter
1332 directional motion of the mobility scooter stops prior to full compression of the pliant assembly
1340 override switch activation decision
1342 restore power
1350 reverse direction decision
1352 reverse operating direction of mobility scooter drive train
1354 restore operating power to mobility scooter drive train
P0 normal operating pressure
P1 system activation pressure
P2 stopped maximum compression pressure
D0 normal operating pressure vessel diameter
D1 system activation pressure vessel diameter
D2 stopped maximum compression pressure vessel diameter
H0 normal operating pressure vessel height
H1 system activation pressure vessel height
H2 stopped maximum compression pressure vessel height
M1 first monitored connection
M2 second monitored connection
S1 first sensed connection
S2 second sensed connection

What is claimed is:

1. An impact resolution system for a mobility scooter, the impact resolution system comprising:
at least one pressure vessel that generates a change in pressure when a compression force is applied to an exterior surface of one or more of the at least one pressure vessel, the at least one pressure vessel being carried by the mobility scooter;
at least one pressure sensor arranged to be affected by a change in pressure within a respective monitored pressure vessel of the at least one pressure vessel; and
an operational controller in communication with each of the at least one pressure sensor, where the operational controller is programmed to a sense the change in pressure when the compression force is applied to the exterior surface of one or more of the at least one pressure vessel and upon sensing of the change in pressure, the operational controller one of directly or indirectly governs moving operation of the mobility scooter,
wherein, when traveling with up to a maximum rated load at up to a maximum rate of travel, upon impact, the impact resolution system causes the mobility scooter to decelerate to a stop.

2. An impact resolution system for a mobility scooter as recited in claim 1, the impact resolution system further comprising a compressible mounting system carrying the at least one pressure vessel, the compressible mounting system comprising at least one compressible member located between the at least one pressure vessel and the mobility scooter.

3. An impact resolution system for a mobility scooter as recited in claim 1, wherein a horizontal compressible dimension of the at least one pressure vessel is determined and fabricated based upon a distance required to stop the mobility scooter, including the maximum rated load, from the maximum rate of travel prior to reaching full compression of the at least one pressure vessel.

4. An impact resolution system for a mobility scooter as recited in claim 1, the impact resolution system further comprising a compressible mounting system carrying the at least one pressure vessel, the compressible mounting system comprising at least one compressible member located between the pressure vessel and the mobility scooter,
wherein a horizontal compressible dimension of the at least one compressible member is determined and fabricated based upon a distance required to stop the mobility scooter conveyance vehicle, including the maximum rated load, from the maximum rate of travel prior to reaching full compression of the at least one compressible member.

5. An impact resolution system for a mobility scooter as recited in claim 1, wherein the at least one pressure vessel is located in at least one of:
(a) a front of the mobility scooter,
(b) a rear of the mobility scooter,
(c) a left side of the mobility scooter,
(d) a right side of the mobility scooter.

6. An impact resolution system for a mobility scooter as recited in claim 1, the impact resolution system further comprising a compressible mounting system carrying the at least one pressure vessel, the compressible mounting system comprising at least one compressible member located between the at least one pressure vessel and the mobility scooter,
wherein a horizontal compressible dimension of the at least one compressible member is determined and fabricated to stop the mobility scooter, including the maximum rated load, from the maximum rate of travel prior to reaching full compression of the at least one compressible member.

7. An impact resolution system for a mobility scooter as recited in claim 1, further comprising a manifold system, the manifold system comprising a series of manifold pipe segments collectively providing fluid communication between each of the at least one pressure vessel and the at least one pressure sensor,
wherein a diameter of the at least one pressure vessel is larger than a diameter of the manifold pipe segments.

8. A method of operating a mobility scooter, the mobility scooter comprising an impact resolution system including at least one pressure vessel extending outward from at least one of a front of the mobility scooter and of a rear of the mobility scooter, the method comprising steps of:
increasing a pressure within one or more of the at least one pressure vessel as a result of contact with an object when the mobility scooter is traveling in a direction of travel;
sensing a pressure increase within one or more of the at least one pressure vessel; and
wherein, when traveling with up to a maximum rated load at up to a maximum rate of travel, upon impact, the impact resolution system senses the pressure increase within the one or more of the at least one pressure vessel, an operational controller signals a drive system in the mobility scooter to reduce speed in the direction of travel causing the mobility scooter to decelerate to a stop.

9. A method of operating a mobility scooter as recited in claim 8, wherein a horizontal compressible dimension of the at least one pressure vessel is determined and fabricated based upon a distance required to stop the mobility scooter, including the maximum rated load, from the maximum rate of travel prior to reaching full compression of the at least one pressure vessel, the method further comprising a step of:
causing the mobility scooter to stop prior to complete compression of the at least one pressure vessel in a horizontal compressible direction.

10. A method of operating a mobility scooter as recited in claim 8, the impact resolution system further comprising a compressible mounting system carrying the at least one pressure vessel, the compressible mounting system comprising at least one compressible member located between one or more of the at least one pressure vessel and the mobility scooter, the method further comprising a step of:
causing the mobility scooter to stop prior to complete compression of the compressible mounting system in a horizontal compressible direction.

11. A method of operating a mobility scooter as recited in claim 8, the impact resolution system further comprising a compressible mounting system carrying the at least one pressure vessel, the compressible mounting system comprising at least one pneumatically compressible member located between the at least one pressure vessel and the mobility scooter, the method further comprising a step of:
causing the mobility scooter to stop prior to complete compression of the at least one pneumatically compressible member in a horizontal compressible direction.

12. A method of operating a mobility scooter as recited in claim 8, the impact resolution system further comprising a compressible mounting system carrying the at least one pressure vessel, the compressible mounting system comprising at least one mechanical compressible member located between the at least one pressure vessel and the mobility scooter, the method further comprising a step of:
causing the mobility scooter to stop prior to complete compression of the at least one mechanical compressible member in a horizontal compressible direction.

13. A method of operating a mobility scooter as recited in claim 8, the impact resolution system further comprising a compressible mounting system carrying the at least one pressure vessel, the compressible mounting system comprising at least one pneumatic compressible member and at least one mechanical compressible member located between the at least one pressure vessel and the mobility scooter, the method further comprising a step of:
causing the mobility scooter to stop prior to complete compression of the at least one pneumatic compressible member and the at least one mechanical compressible member in a horizontal compressible direction.

14. A method of operating a mobility scooter as recited in claim 8, the impact resolution system further comprising a manifold system comprising a series of manifold pipe segments, the manifold system providing fluid communication between the at least one pressure vessel and a pressure sensor, wherein a diameter of the at least one pressure vessel is larger than a diameter of the manifold pipe segments, the method further comprising a step of:
amplifying a pressure change as a result of transferring a pressure change from the at least one pressure vessel to the manifold pipe segments.

15. A method of operating a mobility scooter, the mobility scooter comprising an impact resolution system including at least one pressure vessel extending outward from at least one of a front of the mobility scooter and of a rear of the mobility scooter, the method comprising steps of:
increasing a pressure within one or more of the at least one pressure vessel as a result of impact to the mobility scooter traveling in a direction of travel, wherein a location of the impact is ahead of the mobility scooter respective to the direction of travel;
sensing a pressure increase within one or more of the at least one pressure vessel; and
upon sensing the pressure increase within the one or more of the at least one pressure vessel, an operational controller signals a drive system in the mobility scooter to reduce speed in the direction of travel as a result of the sensed increase in pressure within the one or more of the at least one pressure vessel until the mobility scooter, when traveling with up to a maximum load at up to a maximum rate of travel, decelerates to a stop.

16. A method of operating a mobility scooter as recited in claim 15, wherein a horizontal compressible dimension of the at least one pressure vessel is determined and fabricated based upon a distance required to stop the mobility scooter, including the maximum rated load, from the maximum rate of travel prior to reaching full compression of the at least one pressure vessel, the method further comprising a step of:

causing the mobility scooter to stop prior to complete compression of the at least one pressure vessel in a horizontal compressible direction.

17. A method of operating a mobility scooter as recited in claim 15, the impact resolution system further comprising a compressible mounting system carrying the at least one pressure vessel, the compressible mounting system comprising at least one compressible member located between the at least one pressure vessel and the mobility scooter, the method further comprising a step of:

causing the mobility scooter to stop prior to complete compression of the compressible mounting system in a horizontal compressible direction.

18. A method of operating a mobility scooter as recited in claim 15, the impact resolution system further comprising a compressible mounting system carrying the at least one pressure vessel, the compressible mounting system comprising at least one pneumatically compressible member located between the at least one pressure vessel and the mobility scooter, the method further comprising a step of:

causing the mobility scooter to stop prior to complete compression of the at least one pneumatically compressible member in a horizontal compressible direction.

19. A method of operating a mobility scooter as recited in claim 15, the impact resolution system further comprising a compressible mounting system carrying the at least one pressure vessel, the compressible mounting system comprising at least one mechanical compressible member located between the at least one pressure vessel and the mobility scooter, the method further comprising a step of:

causing the mobility scooter to stop prior to complete compression of the at least one mechanical compressible member in a horizontal compressible direction.

20. A method of operating a mobility scooter as recited in claim 15, the impact resolution system further comprising a compressible mounting system carrying the pressure vessel, the compressible mounting system comprising at least one pneumatic compressible member and at least one mechanical compressible member located between the pressure vessel and the mobility scooter, the method further comprising a step of:

causing the mobility scooter to stop prior to complete compression of the at least one pneumatic compressible member and the at least one mechanical compressible member in a horizontal compressible direction.

21. A method of operating a mobility scooter as recited in claim 15, the impact resolution system further comprising a manifold system comprising a series of manifold pipe segments, the manifold system providing fluid communication between the at least one pressure vessel and a pressure sensor, wherein a diameter of the at least one pressure vessel is larger than a diameter of the manifold pipe segments, the method further comprising a step of:

amplifying a pressure change as a result of transferring a pressure change from the at least one pressure vessel to the manifold pipe segments.

\* \* \* \* \*